United States Patent
Shoji et al.

(10) Patent No.: US 7,489,613 B2
(45) Date of Patent: *Feb. 10, 2009

(54) RECORDING METHOD AND MEDIA HAVING MARKS AND SPACES WITH LENGTHS DEFINED BY A PREDETERMINED MODULATION METHOD

(75) Inventors: Mamoru Shoji, Sakai (JP); Kenji Koishi, Sanda (JP); Atsushi Nakamura, Moriguchi (JP); Takashi Ishida, Yawata (JP); Shuichi Tasaka, Takarazuka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/842,189

(22) Filed: Aug. 21, 2007

(65) Prior Publication Data

US 2007/0291612 A1 Dec. 20, 2007

Related U.S. Application Data

(62) Division of application No. 10/501,500, filed as application No. PCT/JP03/13011 on Oct. 9, 2003, now Pat. No. 7,272,095.

(30) Foreign Application Priority Data

Oct. 10, 2002 (JP) ............................. 2002-297295
Oct. 28, 2002 (JP) ............................. 2002-312432

(51) Int. Cl.
*G11B 7/0045* (2006.01)
(52) U.S. Cl. .................................. 369/59.12
(58) Field of Classification Search ........... None
See application file for complete search history.

(56) References Cited

U.S. PATENT DOCUMENTS 5,490,126 A 2/1996 Furumiya et al.

(Continued)

FOREIGN PATENT DOCUMENTS

| EP | 1335356 A1 | 8/2003 |
|---|---|---|
| EP | 1361570 A2 | 11/2003 |
| JP | 09007176 A | 1/1997 |
| JP | 2002-237051 A | 8/2002 |

(Continued)

OTHER PUBLICATIONS

U.S. Appl. No. 11/842,185, filed Aug. 21, 2007 (Unpublished), Shoji et al.

*Primary Examiner*—Michael V Battaglia
(74) *Attorney, Agent, or Firm*—Panitch Schwarze Belisario & Nadel LLP

(57) ABSTRACT

A data storage medium is provided on which data is to be recorded by modulating the data to generate a plurality of recording modulation codes and irradiating a pulse-like light beam to the data storage medium, so that a plurality of recording marks and spaces which have lengths corresponding to the plurality of recording modulation codes are formed on the data storage medium. At least two of the plurality of recording marks are formed by the light beam emitted according to a recording pulse train. The recording pulse train comprising a first pulse which is disposed at a front and forms a leading edge of the recording mark, a last pulse which is disposed at a backend and forms a trailing edge of the recording mark, and a multi-pulse train which is disposed between the first pulse and the last pulse and forms a center of the recording mark. The multi-pulse train has a pulse period longer than T which represents a reference period of the recording modulation code. The plurality of recording marks have different lengths represented by T with each other. A number of pulses in each of the recording pulse trains is increased by one as the recording mark is increased in length by 2T. A shortest recording mark and a second shortest recording mark are constituted of a single pulse, respectively.

3 Claims, 23 Drawing Sheets

U.S. PATENT DOCUMENTS

| | | |
|---|---|---|
| 5,636,194 A | 6/1997 | Furumiya et al. |
| 5,732,062 A | 3/1998 | Yokoi et al. |
| 5,848,043 A | 12/1998 | Takada et al. |
| 6,018,508 A | 1/2000 | Hasegawa |
| 6,236,635 B1 | 5/2001 | Miyamoto et al. |
| 6,256,277 B1 * | 7/2001 | Saga et al. ............... 369/59.24 |
| 6,411,579 B2 | 6/2002 | Nobukuni et al. |
| 6,426,930 B2 | 7/2002 | Tanaka et al. |
| 6,459,670 B1 | 10/2002 | Kuwahara et al. |
| 6,487,151 B1 | 11/2002 | Nagata et al. |
| 6,611,481 B1 | 8/2003 | Koishi et al. |
| 6,631,109 B2 | 10/2003 | Nakamura |
| 6,664,526 B2 | 12/2003 | Yokoi |
| 6,721,255 B1 | 4/2004 | Gushima et al. |
| 6,728,178 B2 | 4/2004 | Koishi et al. |
| 6,770,346 B2 | 8/2004 | Harigaya et al. |
| 7,082,090 B2 * | 7/2006 | Kato et al. ............... 369/59.11 |
| 7,227,090 B2 * | 6/2007 | Kakuno et al. ............... 200/6 A |
| 7,272,095 B2 | 9/2007 | Shoji et al. |
| 2001/0053115 A1 * | 12/2001 | Nobukuni et al. ........ 369/59.12 |
| 2006/0285477 A1 | 12/2006 | Shoji et al. |
| 2008/0112295 A1 | 5/2008 | Shoji et al. |
| 2008/0112296 A1 | 5/2008 | Shoji et al. |

FOREIGN PATENT DOCUMENTS

| | | |
|---|---|---|
| JP | 2003-030833 A | 1/2003 |
| WO | 99/30316 A2 | 6/1999 |
| WO | WO 02089121 A1 * | 11/2002 |
| WO | WO 03023771 A1 * | 3/2003 |
| WO | WO 03069607 A1 * | 8/2003 |

* cited by examiner

RECORDING METHOD AND MEDIA HAVING MARKS AND SPACES WITH LENGTHS DEFINED BY A PREDETERMINED MODULATION METHOD

CROSS-REFERENCE TO RELATED APPLICATIONS

This application is a divisional of U.S. patent application Ser. No. 10/501,500, filed Jul. 14, 2004, which is a Section 371 of International Application No. PCT/JP2003/013011, filed Oct. 9, 2003, the disclosure of both being incorporated herein by reference.

BACKGROUND OF THE INVENTION

The present invention related to a method for optically recording data on a data storage medium such as an optical disc.

Data storage mediums for optically recording data have received attention as mediums for recording a large amount of digital data.

A phase-change optical disc is one of recordable data recording mediums. The phase-change optical disc has a recording film melted by heating. By irradiating a rotating disc with a light beam of a semiconductor laser modulated based on data to be recorded, a phase change occurs on a part irradiated with the light beam on the recording film and data is recorded.

In the case of an intensive light beam, the part irradiated with the light beam on the recording film is heated to a high temperature and is rapidly cooled thereafter. Thus, the part irradiated with the light beam on the recording film becomes amorphous. In the case of a relatively weak light beam, the part irradiated with the light beam is heated to a moderate high temperature and is gradually cooled thereafter. Thus, the part irradiated with the light beam is crystallized. Normally the part having become amorphous is referred to as a mark and the part crystallized between marks is referred to as a space. Binary data is recorded by using the mark and the space. The string of the marks and the spaces is formed on a track which is spirally provided on the optical disc. Normally a laser power of an intensive light beam is called peak power and a laser power of a weak light beam is called bias power.

When data recorded on the phase-change optical disc is read, a weak light beam not causing a phase change of the recording film is emitted to the optical disc and reflected light is detected. Normally the mark having become amorphous has a low reflectivity and the crystallized space has a high reflectivity. Thus, a difference in quantity of reflected light between the mark and the space is detected to generate a reproduction signal, the reproduction signal is binarized, and then demodulation is performed so as to acquire recorded data.

As a method for recording data on the phase-change optical disc, mark position recording and mark edge recording are available. Normally mark edge recording (mark length recording) can obtain a higher recording density of information. A longer mark can be recorded in mark edge recording as compared with mark position recording.

When a light beam at peak power is emitted to the phase-change optical disc to record a long mark, the rear of the mark has a larger width in the radius direction due to the heat accumulation of the recording film. Thus, there arises a problem that undeleted data remains during direct overwriting and signal crosstalk occurs between tracks, which results in the seriously degradation of the signal quality.

In order to solve the problem, for example, Japanese Patent Laid-Open No. 9-7176 discloses that a mark formed by the mark edge recording is divided into a leading edge, an intermediate portion, and a trailing edge, the leading edge and the trailing edge are each formed by a single laser pulse of a predetermined length, and the intermediate portion is formed by a plurality of laser pulses each having a predetermined period. According to the method, since the intermediate portion is formed by the plurality of laser pulses, it is possible to suppress heat accumulation and prevent an increase in mark width. On the other hand, since the leading edge and the trailing edge of the mark is formed by the laser pulse of a predetermined length, sufficient thermal energy is applied to the recording film. Hence, even in the case of direct overwriting, it is possible to reduce jitter on the edges of a formed mark.

FIGS. 1 and 2 show examples of the waveforms of laser pulses used for forming marks of various lengths according to the conventional art. For example, data to be recorded is recorded according to mark edge recording, which uses recording modulation codes converted according to Run Length Limited (2, 10) modulating scheme. In this case, the recording modulation codes are present with the shortest length 3T to the longest length 11T where T represents a reference period of the recording modulation code of a recording mark. The mark and space, on which recording is performed according to mark edge recording, have a continuous length expressed by a length of the recording modulation code.

When these marks are formed on the optical disc, as described above, a plurality of laser pulses are employed as shown in FIG. 2, in each of marks having respective lengths. FIG. 6 shows a recording pulse train which generates a laser pulse for forming a mark of 6T. In FIG. 1, a pulse 801 at the front is referred to as a first pulse and a pulse 804 at the backend is referred to as a last pulse. Further, a pulse 802 and a pulse 803 between the first pulse and the last pulse are referred to as a multi-pulse train constituted of pulses of a period T.

The multi-pulse train of the mark 6T includes two pulses and the multi-pulse train of mark 7T includes three pulses. Moreover, the multi-pulse train of mark 5T is actually constituted of a single pulse. The number of pulses is increased by one as the mark length is increased by T. Conversely one pulse is reduced as the mark length is reduced by T. Therefore, mark 4T is only constituted of a first pulse and a last pulse and has no multi-pulse train. Moreover, mark 3T is constituted of a single pulse. Normally the first pulse has a width of 0.25 to 1.5 T and the last pulse has a width of 0.25 to 1 T. A single pulse constituting the multi-pulse train has a width of 0.25 to 0.75 T.

In the waveform of a laser pulse shown in FIG. 2, although the width of the last pulse is different from that of the waveform of the laser pulse shown in FIG. 1, a relationship between a mark length and the number of multi-pulse trains forming an intermediate portion is the same as the laser pulse of FIG. 1.

When marks are formed according to the above-described method, marks of different lengths can be readily formed by changing the number of pulses in the intermediate portion. However, according to this conventional method, when a speed for recording data is increased, for example, when data is recorded on an optical disc at a high transfer rate, since the response speed of a laser diode is not ideally high, the rising edge and the falling edge of a pulse becomes dull in a luminous waveform. Thus, a predetermined quantity of heat cannot be applied to the recording film of the optical disc. Particularly since the multi-pulse train has a pulse width of about 0.25 to 0.75T, for example, it becomes difficult to generate a pulse of a sinusoidal wave in some rising times and falling times of a laser. Hence, a correct mark cannot be formed.

BRIEF SUMMARY OF THE INVENTION

It is an object of the present invention to solve the above conventional problem and provide a method for optically recording data that enables correct recording.

The optical data recording method comprising the steps of: modulating data to be recorded, to generate a plurality of recording modulation codes; and emitting a pulse-like light beam to an optical disc, so that a plurality of recording marks and spaces which have lengths corresponding to the plurality of recording modulation codes are formed on the optical disc. In the optical data recording method, at least two of the plurality of recording marks comprises: a first pulse which is disposed at a front and forms a leading edge of the recording mark, a last pulse which is disposed at a backend and forms a trailing edge of the recording mark, and a multi-pulse train which is disposed between the first pulse and the last pulse and forms a center of the recording mark. The multi-pulse train has a pulse period longer than T which represents a reference period of the recording modulation code.

In one embodiment of the present invention, the plurality of recording marks have different lengths represented by nT (n is an integral equal to or larger than 1) and at least two of the recording marks having different n are equal in the number of pulses included in the recording pulse train.

In one embodiment of the present invention, a light beam generated by at least one pulse of the first pulse, the multi-pulse train, and the last pulse train is varied in irradiation power in at least two of the recording marks.

In one embodiment of the present invention, each of the recording pulse trains in the recording marks 2nT and (2n+1)T includes an equal number of pulses in the plurality of recording marks.

In one embodiment of the present invention, each of the recording pulse trains in the recording marks (2n−1)T and 2nT includes an equal number of pulses in the plurality of recording marks.

In one embodiment of the present invention, each of the first pulses has an equal pulse width in the plurality of recording marks.

In one embodiment of the present invention, each of the last pulses have an equal pulse width in the plurality of recording marks.

In one embodiment of the present invention, each of the multi-pulse trains has an equal pulse width and pulse interval in the plurality of recording marks.

In one embodiment of the present invention, the plurality of recording marks include a recording mark formed by a light beam emitted according to the recording pulse train including only one pulse and a recording mark formed by a light beam emitted according to the recording pulse train including only the first pulse and the last pulse, and the recording pulse trains have pulses each being 1T or more in pulse width.

In one embodiment of the present invention, the plurality of recording marks include a recording mark formed by a light beam emitted according to the recording pulse train including only one pulse and a recording mark formed by a light beam emitted according to the recording pulse train including only the first pulse and the last pulse, and the recording pulse trains have adjacent two pulses each being 1T or more in interval.

In one embodiment of the present invention, in the recording pulse train, the multi-pulse area having the multi-pulse train disposed therein, amplitude and a position of at least one of the recording pulse train are set so that a multi-pulse duty or a multi-pulse amplitude average value is set at a predetermined value, the multi-pulse duty being obtained by dividing a pulse width of the multi-pulse train by a period of the multi-pulse train, the multi-pulse amplitude average value being obtained by dividing an amplitude integral of the multi-pulse area by a time width of the multi-pulse area.

In one embodiment of the present invention, the multi-pulse train has a period set at 2T.

In one embodiment of the present invention, the multi-pulse area is defined by rising timing of a front pulse of the multi-pulse train to falling timing of a backend pulse of the multi-pulse train.

In one embodiment of the present invention, the multi-pulse area is defined by falling timing of the first pulse to rising timing of the last pulse.

In one embodiment of the present invention, the method sets rising timing for a front pulse of the recording pulse train and a pulse width for each pulse of the recording pulse train.

In one embodiment of the present invention, setting is made so that a front space width between the first pulse and the front pulse of the pulse train and a backend space width between a backend pulse of the multi-pulse train and the last pulse are almost equal to each other.

In one embodiment of the present invention, the plurality of recording modulation codes have different lengths represented by nT (n is an integer equal to or more than 1), and the set amplitude and position of at least one pulse of the recording pulse train are constant values regardless of a length of the recording modulation code.

In one embodiment of the present invention, the plurality of recording modulation codes have different lengths represented by nT (n is an integer equal to or more than 1), and the set amplitude and position of at least one pulse of the recording pulse train are set at different values depending upon whether a length of the recording modulation code is an odd-numbered times or an even-numbered times as large as T.

In one embodiment of the present invention, the plurality of recording modulation codes have different lengths represented by nT (n is an integer equal to or more than 1), and the set amplitude and position of at least one pulse of the recording pulse train are set at different values according to a length of the recording modulation code.

In one embodiment of the present invention, the plurality of recording modulation codes have different lengths represented by nT (n is an integer equal to or more than 1), the plurality of recording modulation codes are classified as a plurality of code groups, the set amplitude and position of at least one pulse of the recording pulse train are set at different values for each of the code groups.

In one embodiment of the present invention, the plurality of recording modulation codes have different lengths represented by nT (n is an integer equal to or more than 1) and the multi-pulse duty or the multi-pulse amplitude average value is set at a constant value regardless of a length of the recording modulation code.

In one embodiment of the present invention, the plurality of recording modulation codes have different lengths represented by nT (n is an integer equal to or more than 1) and the multi-pulse duty or the multi-pulse amplitude average value is set at a different value depending upon whether a length of the recording modulation code is an odd-numbered times or an even-numbered times as large as T.

In one embodiment of the present invention, the plurality of recording modulation codes have different lengths represented by nT (n is an integer equal to or more than 1) and the multi-pulse duty or the multi-pulse amplitude average value is set at a different value according to a length of the recording modulation code.

In one embodiment of the present invention, the plurality of recording modulation codes have different lengths represented by nT (n is an integer equal to or more than 1), the plurality of recording modulation codes are classified as a plurality of code groups, and the multi-pulse duty or the multi-pulse amplitude average value is set at a different value for each of the code groups.

In one embodiment of the present invention, the multi-pulse duty or the multi-pulse amplitude average value are determined by forming a recording mark using the recording pulse train, and evaluating an amplitude value around a center of a reproduction signal obtained by reproducing the formed recording mark.

According to another aspect of the present invention, a data recording device comprises: a motor to place an optical disc thereon and rotate the optical disc; an optical head having light source and emitting a light beam onto the optical disc placed on the motor; a signal processing section modulating a data to be recorded and generating a plurality of recording modulation codes; a recording pulse train generating section generating a plurality of recording pulse trains for driving the light source based on the recording modulation codes, so as to form on the optical disc a plurality of marks having lengths corresponding to the respective recording modulation codes. At least two of the plurality of recording marks being formed by a light beam emitted according to a recording pulse train, the recording pulse train, comprises: a first pulse which is disposed at a front and forms a leading edge of the recording mark, a last pulse which is disposed at a backend and forms a trailing edge of the recording mark, and a multi-pulse train which is disposed between the first pulse and the last pulse and forms a center of the recording mark. The multi-pulse train having a pulse period longer than T which represents a reference period of the recording modulation code.

In one embodiment of the present invention, the plurality of recording marks have different lengths represented by nT (n is an integral equal to or larger than 1) and at least two of the recording marks having different n are equal in the number of pulses included in the recording pulse train.

In one embodiment of the present invention, a light beam generated by at least one pulse of the first pulse, the multi-pulse train, and the last pulse train is varied in irradiation power in at least two of the recording marks.

In one embodiment of the present invention, in the recording pulse train, the multi-pulse area having the multi-pulse train disposed therein, amplitude and a position of at least one of the recording pulse train are set so that a multi-pulse duty or a multi-pulse amplitude average value is set at a predetermined value, the multi-pulse duty being obtained by dividing a pulse width of the multi-pulse train by a period of the multi-pulse train, the multi-pulse amplitude average value being obtained by dividing an amplitude integral of the multi-pulse area by a time width of the multi-pulse area.

In one embodiment of the present invention, the multi-pulse train has a period set at 2T.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Embodiment 1

Figure 3:
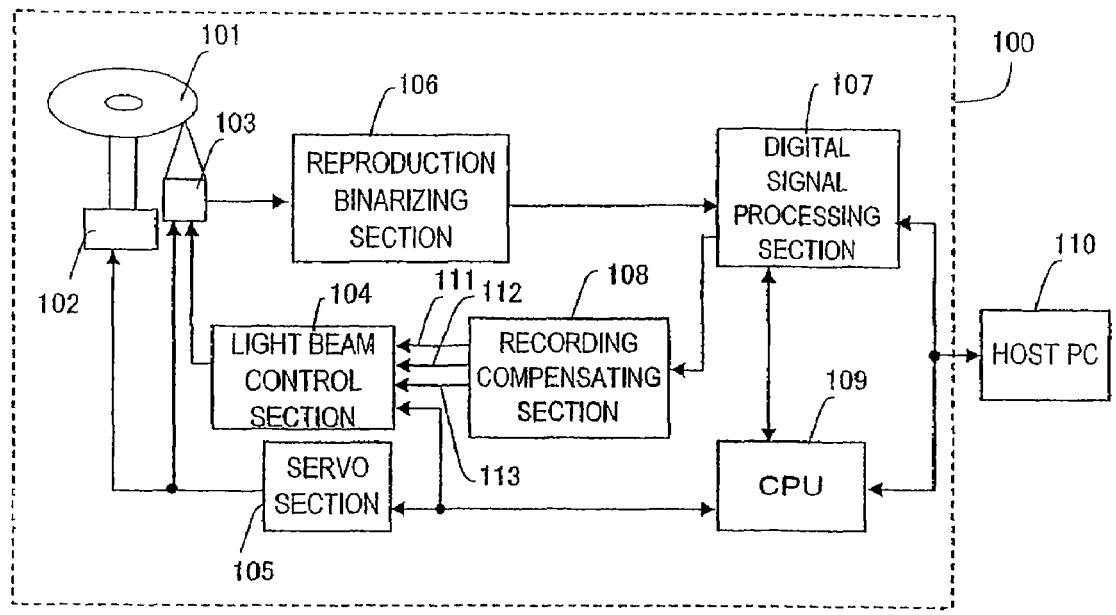
FIG. 3 is a block diagram showing Embodiment 1 of a recording device according to the present invention.

FIG. 3 is a block diagram showing Embodiment 1 of a data recording device according to the present invention. As shown in FIG. 3, a data recording device 100 comprises a spindle motor 102, an optical head 103, a light beam control section 104, a servo section 105, a reproduction binarizing section 106, a digital signal processing section 107, a recording compensating section 108, and a CPU 109. The light beam control section 104 and the recording compensating section 108 form a recording pulse train generating section.

An optical disc 101 is placed on the spindle motor 102 and the spindle motor 102 rotates the optical disc 101. The optical disc 101 has one or more tracks for recording data. The tracks are shaped like spirals or concentric circles. The optical disc 101 has a recording film melted by heating. When a light beam of a semiconductor laser is emitted which is modulated based on data to be recorded, a phase change occurs on a part irradiated with the light beam on the recording film.

The optical head 103 has a laser diode serving as a light source which irradiates the optical disc 101 with a light beam for recording data. Further, the optical head 103 converts light reflected from the optical disc 101 into an electrical signal, and outputs the converted signal as a reproduction signal to the reproduction binarizing section 106.

The light beam control section 104 generates current for driving the laser diode of the optical head 103 and controls the power of a light beam outputted from the laser diode according to an instruction of the CPU 109.

The servo section 105 controls the position of the optical head 103 and performs focus control and tracking control on a light beam emitted from the optical head 103. Moreover, the servo section 105 controls the rotation of the spindle motor 102. The reproduction binarizing section 106 amplifies a reproduction signal obtained from the optical head 103 and binarizes the signal to generate a binarized signal. Further, the reproduction binarizing section 106 generates a clock in synchronization with the binarized signal by using an internal PLL (not shown).

The digital signal processing section 107 performs predetermined demodulation and error correction on the binarized signal. When data is recorded, the digital signal processing section 107 added an error correction code to recorded data and performs predetermined modulation to generate modulation data. The recording compensating section 108 converts the modulation data into light modulation data constituted of pulse trains, adjusts the pulse width or the like of the light modulation data based on information acquired from a reproduction signal of a disc information area and information having been stored in the CPU 109, performs conversion into a signal of a recording pulse train suitable for the formation of a mark, and outputs the signal. The CPU 109 controls the whole data recording device 100.

A host PC 110 is constituted of a computer (not shown), an application (not shown), and an operating system (not shown) and requests the date recording device 100 to perform recording and reproduction. When the optical disc 101 is loaded into the data recording device 100, the data recording device 100 outputs a light beam having predetermined irradiation power from the optical head 103 and controls the light beam control section 104 and the servo section 105 so that reproduction is performed on the disc information area (normally provided around the innermost periphery of the disc) of the optical disc 101. Thus, irradiation power information or the like for recording is acquired.

Figure 4:
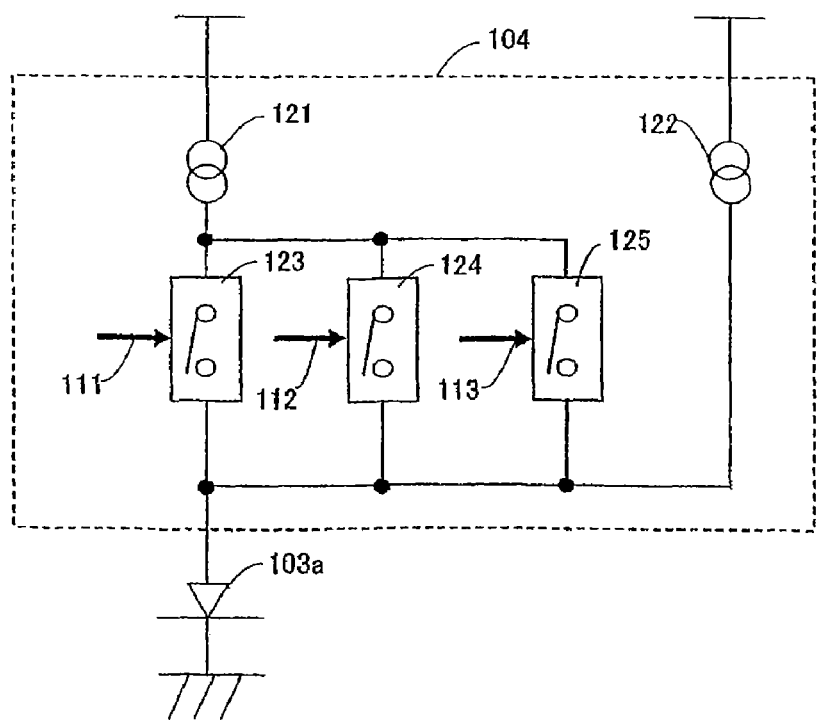
FIG. 4 is a diagram showing the configuration of a light beam control section in the recording device of FIG. 3.
Figure 5:
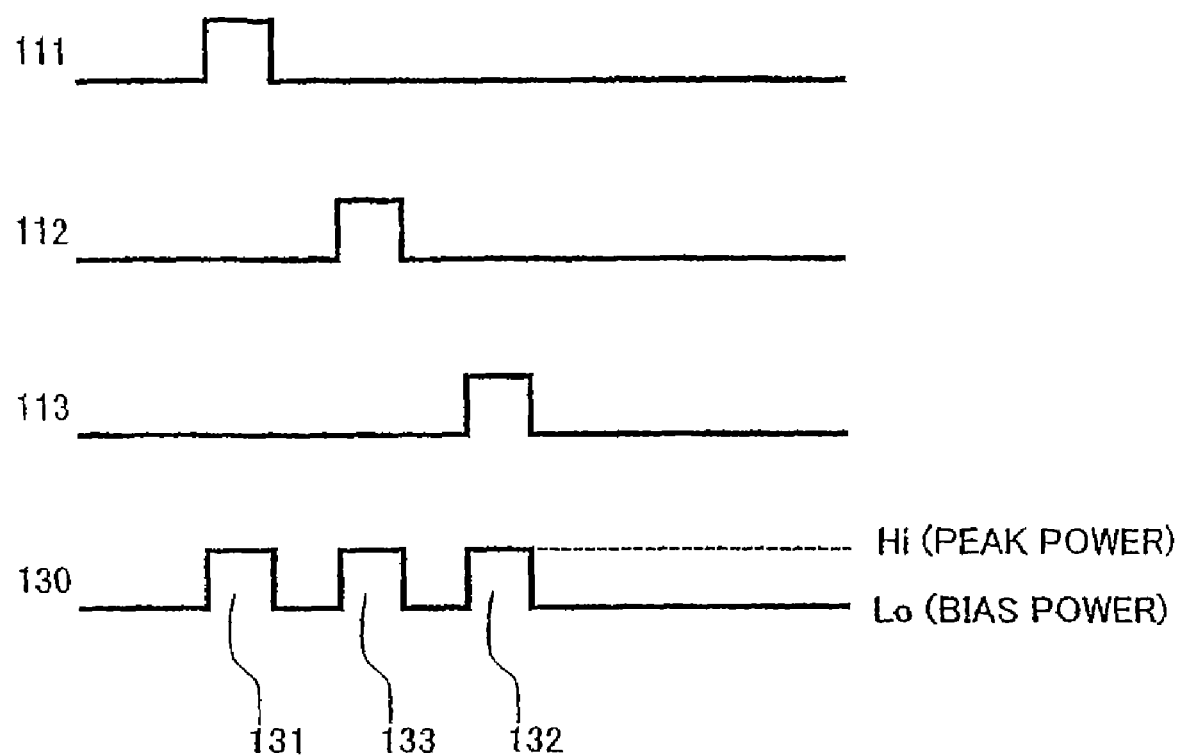
FIG. 5 is a diagram showing a signal inputted to the light beam control section and a signal outputted from the light beam control section.

Referring to FIGS. 3 to 5, a recording operation will be discussed below. FIG. 4 shows the specific configuration of the light beam control section 104.

The light beam control section 104 generates current for driving a laser diode 103a of the optical head 103. Thus, the light beam control section 104 includes a current source 122 for causing a laser diode 103a to emit light with bias power, a current source 121 for causing the laser diode 103a to emit light with peak power, and switches 123, 124, and 125. The current source 121 and the current source 122 are connected in parallel with the laser diode 103a, and the switches 123, 124, and 125 are inserted in parallel between the current source 121 and the laser diode 103a.

As shown in FIG. 3, during recording, the digital signal processing section 107 adds an error correction code to data to be recorded and performs predetermined modulation to generate modulation data including a recording modulation code. The recording compensating section 108 receives modulation data and converts the data into light modulation data. The light modulation data is constituted of recording pulse trains for generating driving pulse current to be applied to the laser diode to form a recording mark and a recording space on the optical disc. The recording mark and the recording space correspond to the recording modulation code included in the modulation data. At this point, the recording compensating section 108 makes fine adjustments on the widths and timing of pulses in the recording pulse trains based on information acquired by reproducing disc information area of the optical disc and information having been stored in the CPU 109, and the recording compensating section 108 adjusts the recording pulse trains so as to have the most suitable pulse waveform according to the kind and recording speed of the optical disc.

FIG. 5 schematically shows light modulation data generated by the recording compensating section 108. A recording pulse train 130 for forming a single recording mark includes a first pulse 131 which is disposed at the front of the recording pulse train 130 and forms a leading edge of the recording mark, a last pulse 132 which is disposed at the backend of the recording pulse train 130 and forms a trailing edge of the recording mark, and a multi-pulse train 133 which is disposed between the first pulse 131 and the last pulse 132 and forms the intermediate portion of the recording mark. In FIG. 5, although the multi-pulse train 133 only includes a single pulse, the multi-pulse train 133 may include two or more pulses according to a length of the recording mark. Further, depending on a length of the recording mark, the multi-pulse train 133 may not be included but only the first pulse 131 and the last pulse 132 may be included in the recording pulse 130. Alternatively, the mark having the shortest length may include a pulse having a length different from the marks having other longer length.

The recording compensating section 108 generates signals 111, 112, and 113 which only include the first pulse 131, the multi-pulse train 133, and the last pulse 132 of the recording pulse train 130, respectively. The recording compensating section 108 outputs the signals to the switches 123, 124, and 125 of the light beam driving section 104, respectively. The first pulse 131, the multi-pulse train 133, and the last pulse 132 included in the signals 111, 112, and 113 are each shifted at predetermined timing.

The switches 123, 124, and 125 having received the signals 111, 112, and 113 enter a period ON during which the signals are set at a high level. Hence, a recording pulse train (driving pulse train) is generated which has a waveform similar to that of the recording pulse train 130 and has peak power and bias power as a high level and a low level. The laser diode 103a is driven by the driving pulse train and a recording mark is formed on the optical disc in response to the irradiation of the laser diode.

The following will describe recording pulse trains for forming recording marks according to the present embodiment. In the following specific examples, for example, recording data is modulated by Run Length Limited (2, 10) modulating scheme and a mark is recorded on an optical disc according to mark edge recording. In this modulating scheme, marks and spaces from 3T to 11T are used where T represents a referential clock period.

Figure 6:
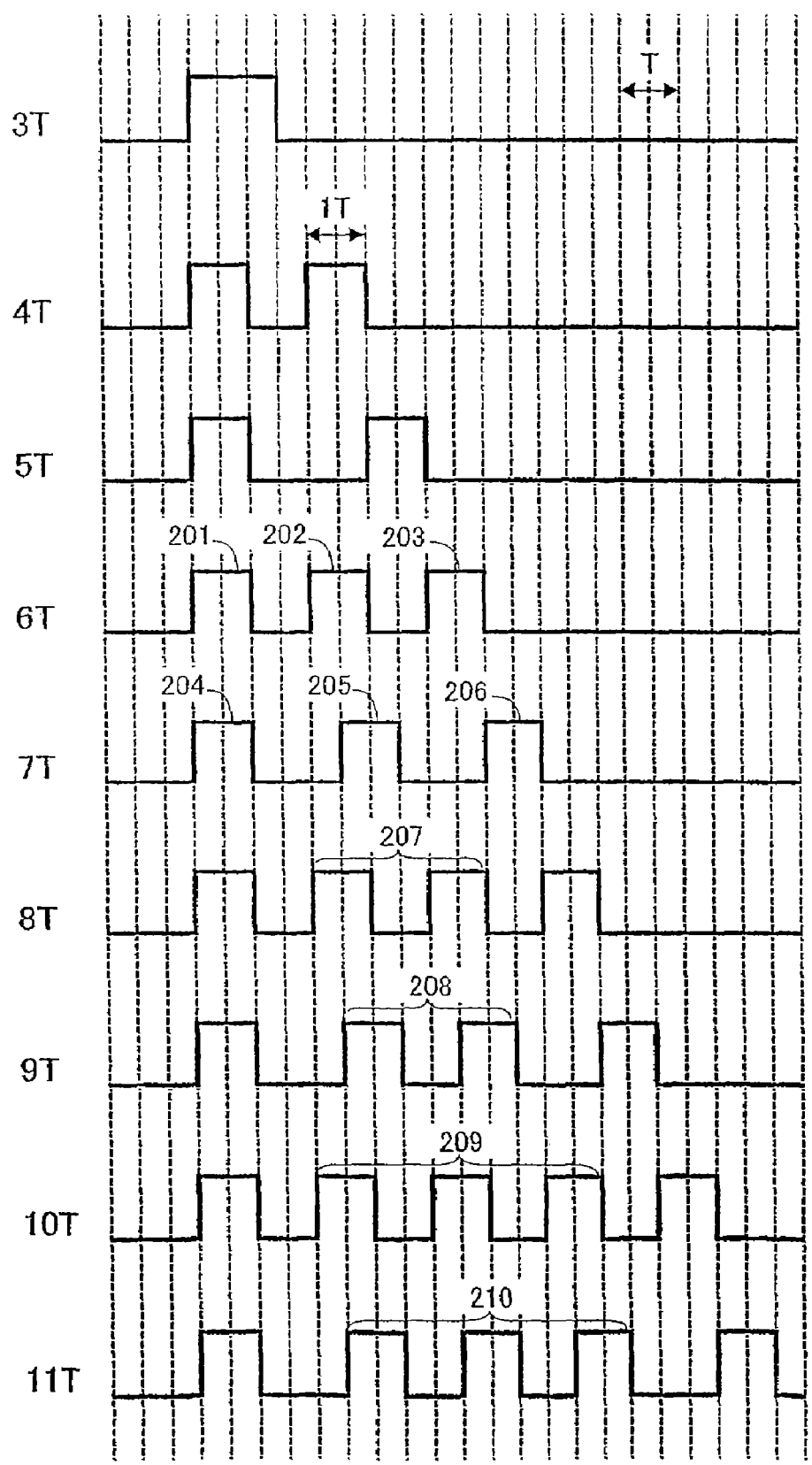
FIG. 6 is a diagram showing Example 1 of a recording pulse train according to Embodiment 1.

FIG. 6 shows recording pulse trains according to Example 1 of the present embodiment. FIG. 6 shows, from the above, recording pulse trains for forming recording marks 3T to 11T.

As shown in FIG. 6, for example, a recording pulse train for forming a recording mark 6T includes a first pulse 201 disposed at the front, a last pulse 203 disposed at the backend, and a multi-pulse train 202 disposed between the first pulse 201 and the last pulse 203.

Further, a recording pulse train for forming a recording mark 7T includes a first pulse 204 disposed at the front, a last pulse 206 disposed at the backend, and a multi-pulse train 205 disposed between the first pulse 204 and the last pulse 206.

In these recording pulse trains, the multi-pulse trains 202 and 205 are each constituted of a single pulse. Moreover, in recording pulse trains 8T and 9T, multi-pulse trains 207 and 208 each include two pulses. In recording pulse trains 10T and 11T, multi-pulse trains 209 and 210 each include three pulses.

In this way, in the recording pulse trains of the present embodiment, in the recording pulse trains for forming 2nT and (2n+1)T recording marks where n represents an integer equal to or larger than 2, each of the multi-pulse trains include an equal number of pulses.

Therefore, the number of pulses in the multi-pulse train is increased by one as the mark is increased in length by 2T. At this point, a multi-pulse is generated at two kinds of timing. Even in the case of two recording marks including multi-pulse trains, each having an equal number of pulses, the front pulse of a multi-pulse train for the mark of an even-numbered reference period T precedes, by 0.5T, the front pulse of a multi-pulse train for the mark of an odd-numbered reference period T. Namely, an interval between the first pulse and the front pulse of the multi-pulse train is 0.5T shorter in the even-numbered mark T. Moreover, an interval between the backend pulse of the multi-pulse train and the last pulse is 0.5T shorter in the even-numbered mark T.

As shown in FIG. 6, in the recording pulse trains for forming the recording marks 3T to 11T, the first pulse, the last pulse, and the pulses of the multi-pulse train are almost equal in pulse width and the pulse width is equal to the reference period T. The pulse interval of the multi-pulse train is also equal to the reference period T. Namely, the pulse period of the multi-pulse train is 2T which is two times as large as the reference period T.

Moreover, as shown in FIG. 6, each of the recording pulse trains forming the marks 4T and 5T is only constituted of a first pulse and a last pulse and includes no multi-path train in Example 1. The recording pulse train forming the mark 3T is constituted of a single pulse. Therefore, considering the first pulse and the last pulse in combination, in the case of the recording pulses of Example 1, an equal number of pulses is included in each of the recording pulses for forming 2nT and (2n+1)T recording marks where n is an integer equal to or larger than 2.

When such recording pulse trains are used to form recording marks, the pulse width of the pulse constituting the multi-pulse train is almost equal to the reference period T. The pulse width is approximately two times that of a pulse constituting a conventional multi-pulse train. It is possible to relatively reduce the influence of the rising time and falling time of a laser in a pulse, so that the recording mark becomes resistant to deformation. Further, since the first pulse and the last pulse are equal in width in each mark, the edge position of each mark can be accurately recorded with ease. Particularly when the edge position of the mark is varied and the jitter of a reproduction signal is increased by recording data on the optical disc at a high transfer rate, the recording pulse trains of Example 1 are effective.

Figure 7:
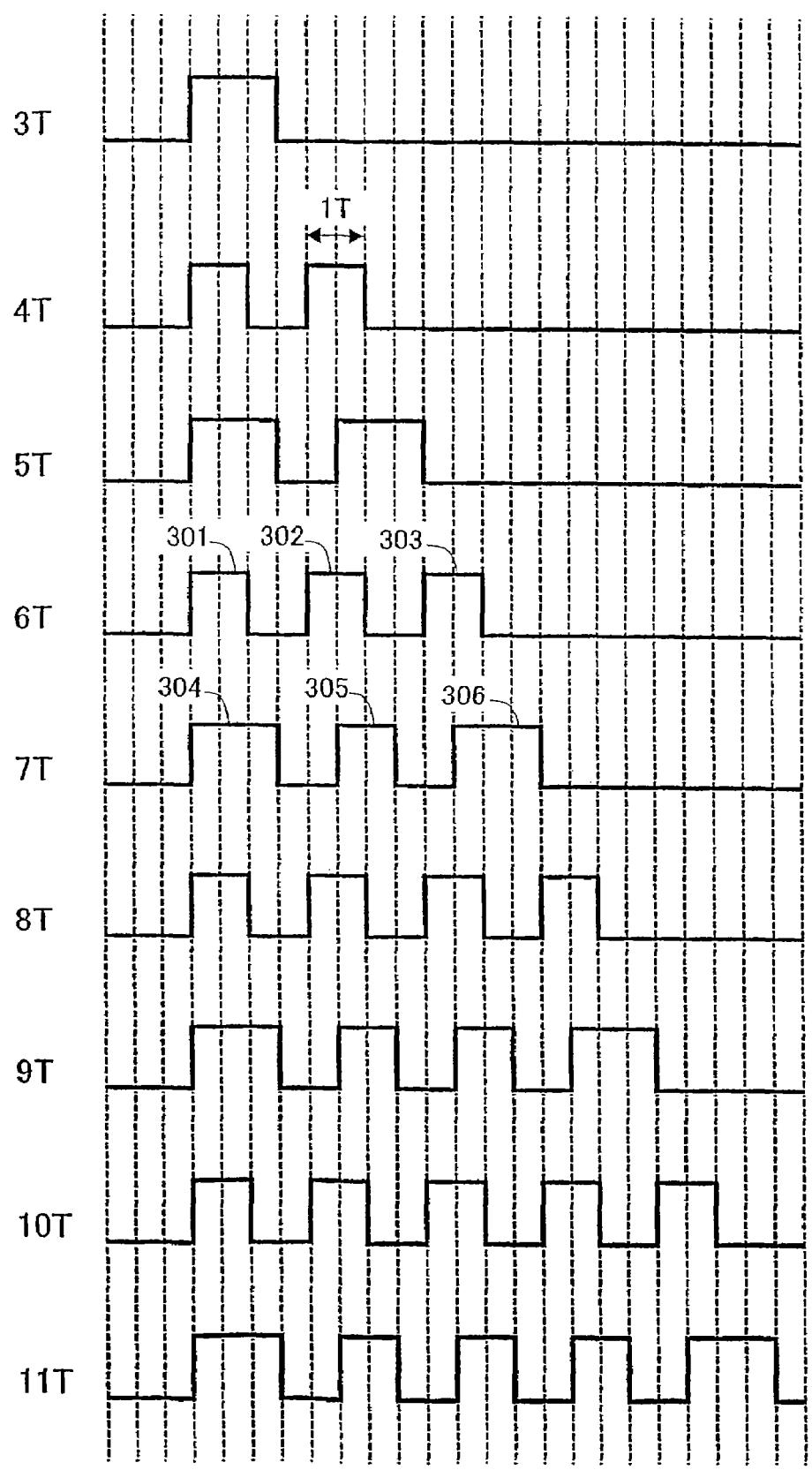
FIG. 7 is a diagram showing Example 2 of the recording pulse train according to Embodiment 1.

FIG. 7 shows recording pulse trains according to Example 2 of the present embodiment. As with Example 1 of FIG. 6, in the recording pulse trains for forming recording marks 3T to 11T, an equal number of pulses constitutes a multi-pulse train in each of 2nT and (2n+1)T marks. Further, as the mark is increased in length by 2T, the number of pulses in the multi-pulse train is increased by one.

Moreover, each of the recording pulse trains for forming the recording marks 6T to 11T is constituted of a first pulse, a multi-pulse train, and a last pulse train. For example, the recording pulse train for forming the recording mark 6T includes a first pulse 301 disposed at the front, a last pulse 303 disposed at the backend, and a multi-pulse train 302 disposed between the first pulse 301 and the last pulse 303. The recording pulse train for forming the recording mark 7T includes a first pulse 304 disposed at the front, a last pulse 306 disposed at the backend, and a multi-pulse train 305 disposed between the first pulse 304 and the last pulse 306. The recording pulse train for 3T only includes a first pulse. The recording pulse trains for 4T and 5T are each constituted only of a first pulse and a last pulse.

As shown in FIG. 7, as to the recording pulses forming the recording marks, for the first pulse, the last pulse, and the pulses of the multi-pulse train, an almost equal interval is provided between adjacent pulses. In a recording pulse train of odd-numbered T, the first pulse and the last pulse are different in width from the other pulses. For example, the width is about 1.5T. The first pulse and the last pulse in the recording pulse train of an even-numbered T is about 1T in width and the pulses constituting the multi-pulse trains of all the recording marks are about 1T in width.

According to the recording pulse trains of Example 2, an interval between adjacent two pulses is almost equal in each of the recording pulse trains. Thus, each of the recording marks formed using the recording pulse trains of Example 2 has an almost equal width in the radius direction of the optical disc. Hence, by properly selecting peak power of a laser diode, it is possible to reduce crosstalk, which is a leakage of a reproduction signal from an adjacent track, and jitter caused by cross erase resulted from recording on an adjacent track.

Figure 8:
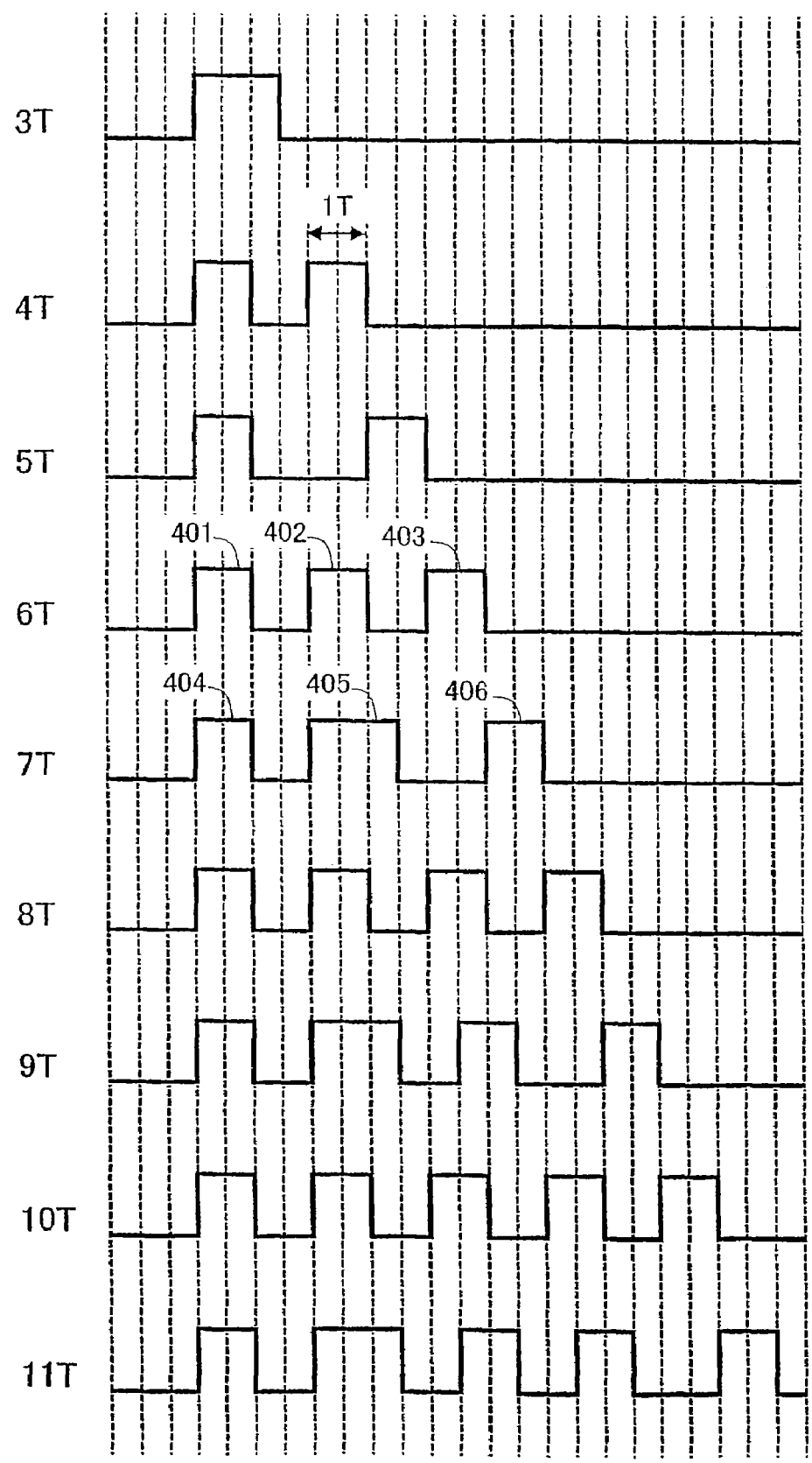
FIG. 8 is a diagram showing Example 3 of the recording pulse train according to Embodiment 1.

FIG. 8 shows recording pulse trains according to Example 3 of the present embodiment. As with Example 1 of FIG. 6, in the recording pulse trains for forming recording marks 3T to 11T, an equal number of pulses constitutes a multi-pulse train in each of 2nT and (2n+1)T marks. Further, as the mark is increased in length by 2T, the number of pulses in a multi-pulse train is increased by one.

Moreover, each of the recording pulse trains for forming the recording marks 6T to 11T is constituted of a first pulse, a multi-pulse train, and a last pulse train. For example, the recording pulse train for forming the recording mark 6T includes a first pulse 401 disposed at the front, a last pulse 403 disposed at the backend, and a multi-pulse train 402 disposed between the first pulse 401 and the last pulse 403. The recording pulse train for forming the recording mark 7T includes a first pulse 404 disposed at the front, a last pulse 406 disposed at the backend, and a multi-pulse train 405 disposed between the first pulse 404 and the last pulse 406. The recording pulse train for 3T only includes a first pulse. The recording pulse trains for 4T and 5T are each constituted only of a first pulse and a last pulse.

In the case of the recording pulse trains of Example 3, the front pulse of the multi-pulse train is different in width from the other pulses in the recording pulse train of an odd-numbered T mark. For example, the width is about 1.5T. The first pulse, the last pulse, and pulses other than the front pulse of the multi-pulse train are almost equal in width in all the marks. The width is about 1T. As to a width between adjacent pulses, an interval between the backend pulse of the multi-pulse train and the last pulse is larger than an interval between any other adjacent pulses in the odd-numbered T mark. For example, an interval is about 1.5T between the backend pulse of the multi-pulse train and the last pulse, whereas an interval is about 1T between any other adjacent pulses.

Besides, when laser power is insufficient at the rear of the odd-numbered T mark, instead of the front pulse of the multi-pulse train, the pulse at the backend may be larger in width than the other pulses. Further, an interval between the first pulse and the front pulse of the multi-pulse train may be larger than an interval between the other intervals.

The recording pulse trains of Example 3 are characterized by the features of the recording pulse trains of both Example 1 and Example 2. In the event of serious influence of a variation in the edge position of the recording mark, the crosstalk of a reproduction signal, and cross erase during recording, the influence can be reduced by forming recording marks using the recording pulse trains of Example 3.

Figure 9:
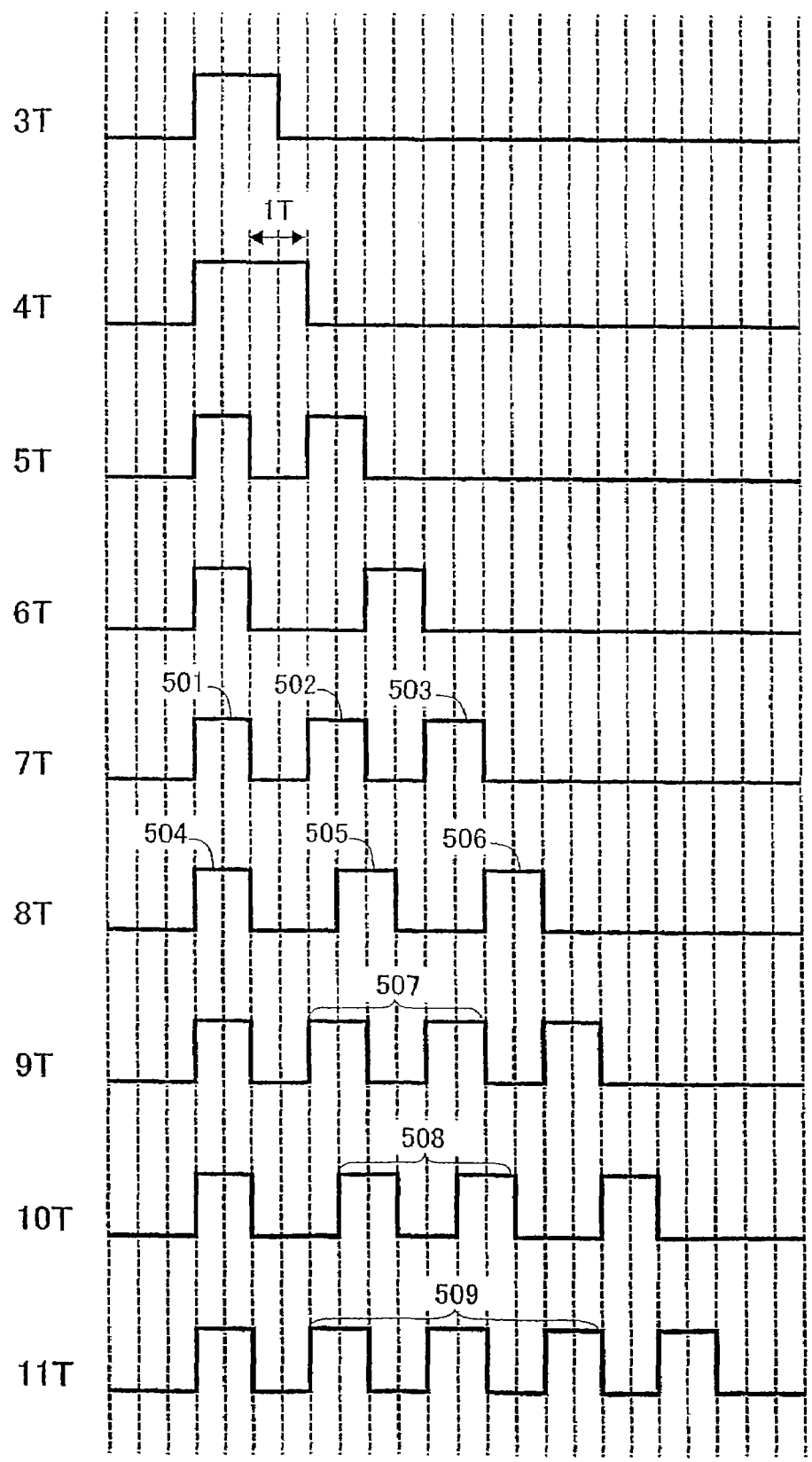
FIG. 9 is a diagram showing Example 4 of the recording pulse train according to Embodiment 1.

FIG. 9 shows recording pulse trains according to Example 4 of the present embodiment. As with the above-described examples, for example, the recording pulse train for forming a recording mark 7T includes a first pulse 501 disposed at the front, a last pulse 503 disposed at the backend, and a multi-pulse train 502 disposed between the first pulse 501 and the last pulse 503. The recording pulse train for forming a recording mark 8T includes a first pulse 504 disposed at the front, a last pulse 506 disposed at the backend, and a multi-pulse train 505 disposed between the first pulse 504 and the last pulse 506.

In these recording pulse trains, the multi-pulse trains 502 and 505 are each constituted of a single pulse. Further, in recording pulse trains 9T and 10T, multi-pulse trains 507 and 508 each include two pulses. In a recording pulse train 11T, a multi-pulse train 509 includes three pulses.

In this way, according to the recording pulse trains of Example 4, each of the multi-pulse trains includes an equal number of pulses in the recording pulse trains for forming recording marks (2n−1)T and 2nT where n represents an integer equal to or larger than 4.

Therefore, as the mark is increased in length by 2T, the number of pulses in the multi-pulse train is increased by one. At this point, the multi-pulse is generated at two kinds of timing. Even in the case of two recording marks including multi-pulse trains, each having an equal number of pulses, the front pulse of a multi-pulse train for a mark of an odd-numbered reference period T precedes, by 0.5T, the front pulse of a multi-pulse train for a mark of an even-numbered reference period T. Namely, an interval between the first pulse and the front pulse of the multi-pulse train is 0.5T shorter in an odd-numbered mark T. Moreover, an interval between the backend pulse of the multi-pulse train and the last pulse is 0.5T shorter in an odd-numbered mark T.

As shown in FIG. 9, in the recording pulse trains for forming the recording marks 3T to 11T, the first pulse, the last pulse, and the pulses of the multi-pulse train are almost equal in pulse width and the pulse width is equal to the reference period T. The pulse interval of the multi-pulse train is also equal to the reference frequency T. Namely, the pulse period of the multi-pulse train is 2T which is two times as large as the reference period T.

Further, in Example 4, each of the recording pulse trains forming the marks 5T and 6T is only constituted of the first pulse and the last pulse and includes no multi-pulse train. The recording pulse trains forming the marks 3T and 4T are each constituted of a single pulse. However, the recording pulse train for 4T uses a first pulse which is 0.5T longer than 3T. Therefore, considering the first pulse and the last pulse in combination, in the case of the recording pulses of Example 4, an equal number of pulses is included in each of the recording pulse trains for forming (2n−1)T and 2nT recording marks where n represents an integer equal to or larger than 1.

When such recording pulse trains are used to form recording marks, the pulse width of the pulse constituting the multi-pulse train is almost equal to the reference period T. The pulse width is approximately two times that of a pulse constituting a conventional multi-pulse train. It is possible to relatively reduce the influence of the rising time and falling time of a laser in a pulse, so that the recording mark becomes resistant to deformation. Further, since the first pulse and the last pulse are equal in width in each mark, the edge position of each mark can be accurately recorded with ease. Particularly when the edge position of the mark is varied and the jitter of a reproduction signal is increased by recording data on the optical disc at a high transfer rate, the recording pulse trains of Example 4 are effective.

Figure 10:
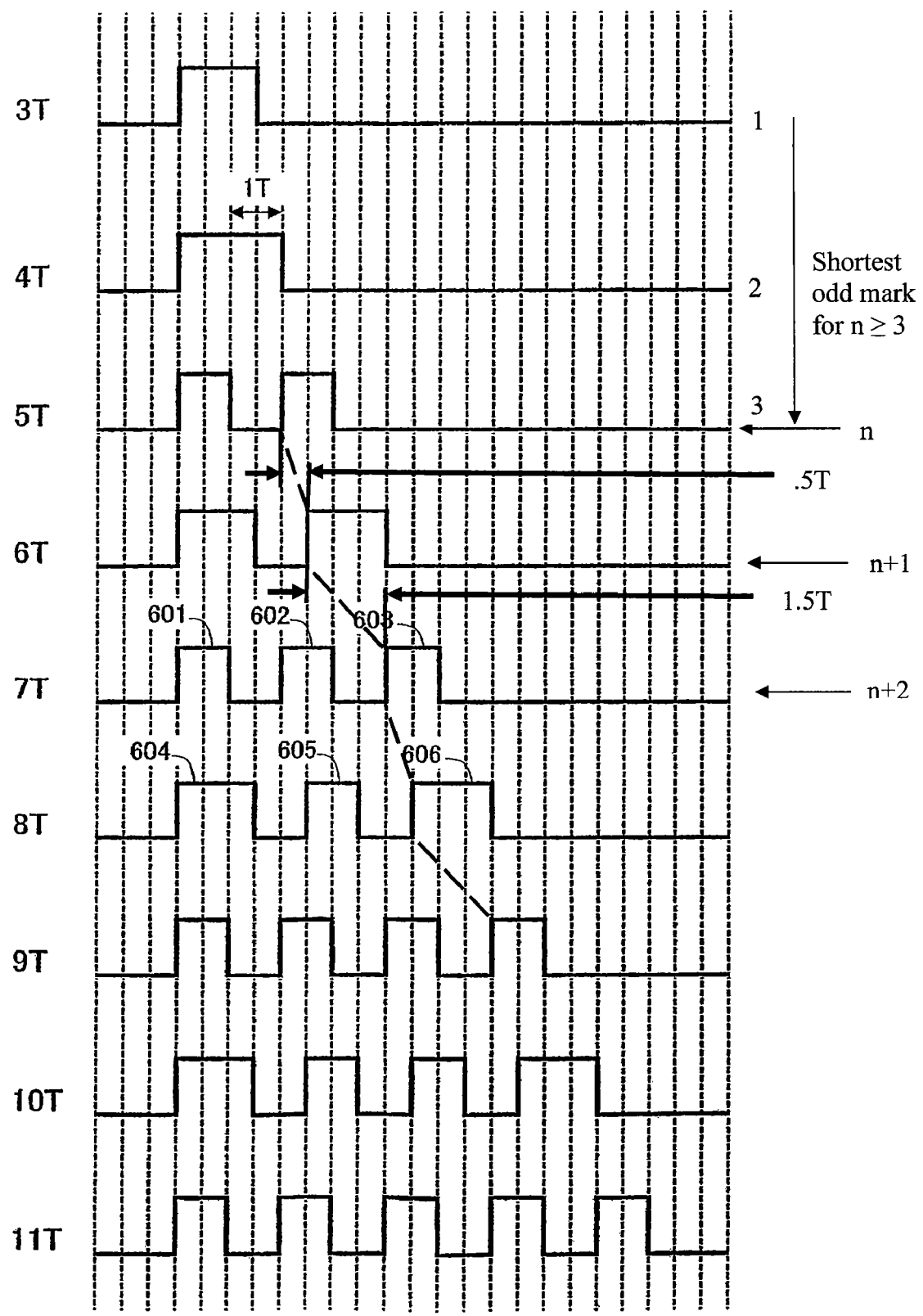
FIG. 10 is a diagram showing Example 5 of the recording pulse train according to Embodiment 1.

FIG. 10 shows recording pulse trains according to Example 5 of the present embodiment. As with Example 4 of FIG. 9, an equal number of pulses constitutes a multi-pulse train in each of (2n−1)T and 2nT marks in the recording pulse trains for forming recording marks 3T to 11T. Further, as the mark is increased in length by 2T, the number of pulses in the multi-pulse train is increased by one.

Moreover, each of the recording pulse trains for forming the recording marks 7T to 11T is constituted of a first pulse, a multi-pulse train, and a last pulse train. For example, the recording pulse train for forming the recording mark 7T includes a first pulse 601 disposed at the front, a last pulse 603 disposed at the backend, and a multi-pulse train 602 disposed between the first pulse 601 and the last pulse 603. The recording pulse train for forming the recording mark 8T includes a first pulse 604 disposed at the front, a last pulse 606 disposed at the backend, and a multi-pulse train 605 disposed between the first pulse 604 and the last pulse 606. The recording pulse trains for 3T and 4T only include a first pulse. The recording pulse trains for 5T and 6T are each constituted only of a first pulse and a last pulse.

As shown in FIG. 10, in the recording pulses for forming each recording mark regarding the first pulse, the last pulse, and the pulses of the multi-pulse train, an interval is almost equal between adjacent pulses. In the recording pulse train of even-numbered T, a first pulse and a last pulse are different in width from the other pulses. For example, the width is about 1.5T. The first pulse and the last pulse in the recording pulse train of an odd-numbered T is about 1T in width and the pulses constituting the multi-pulse trains of all the recording marks are about 1T in width.

According to the recording pulse trains of Example 5, an interval between adjacent two pulses is almost equal in each of the recording pulse trains. Thus, each of the recording marks formed using the recording pulse trains of Example 5 has an almost equal width in the radius direction of the optical disc. Hence, by properly selecting peak power of a laser diode, it is possible to reduce crosstalk, which is a leakage of a reproduction signal from an adjacent track, and jitter caused by cross erase resulted from recording on an adjacent track.

Figure 11:
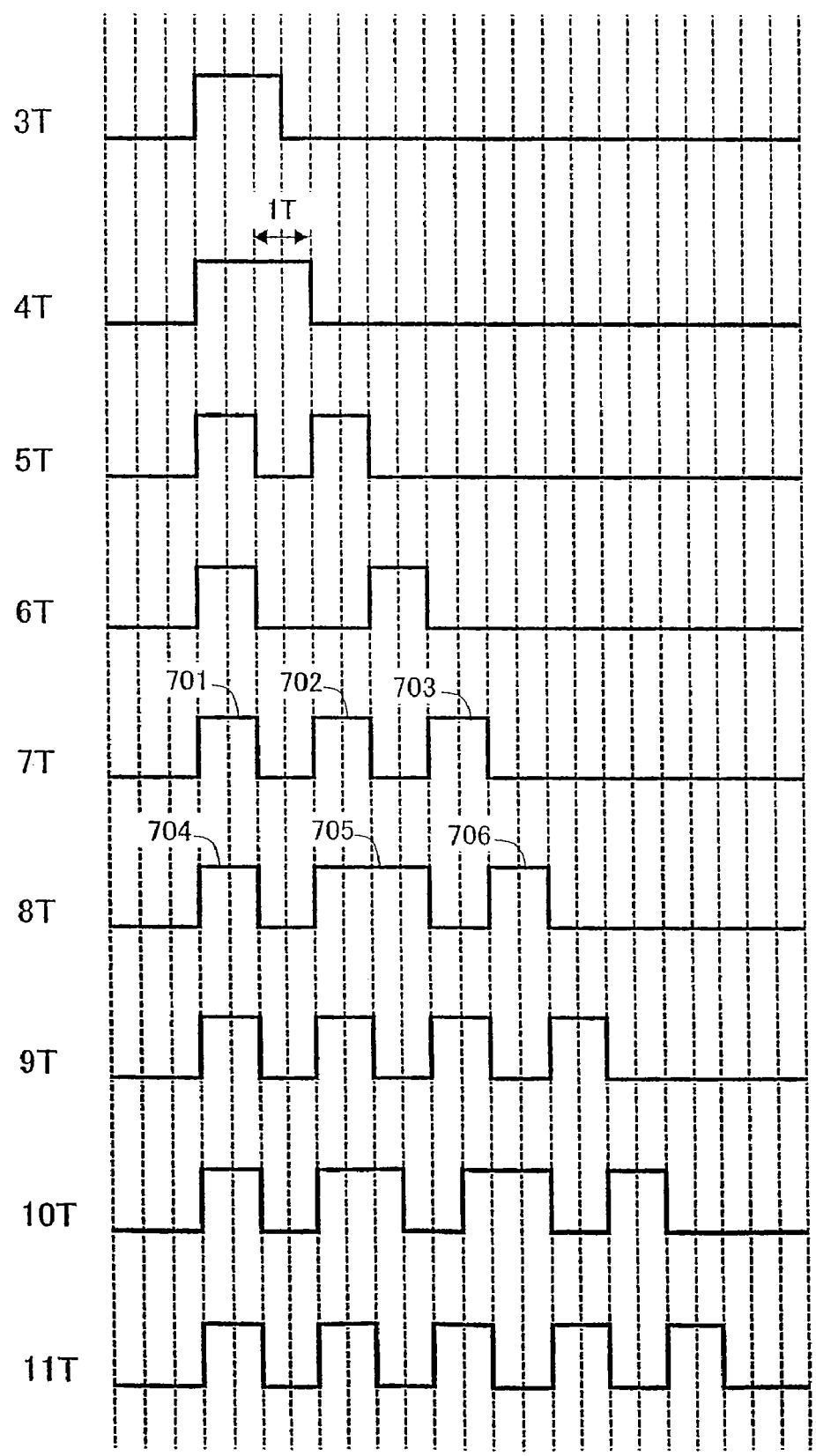
FIG. 11 is a diagram showing Example 6 of the recording pulse train according to Embodiment 1.

FIG. 11 shows recording pulse trains according to Example 6 of the present embodiment. As with Example 4 of FIG. 9, an equal number of pulses constitutes a multi-pulse train in each of (2n−1)T and 2nT marks in the recording pulse trains for forming recording marks 3T to 11T. Further, as the mark is increased in length by 2T, the number of pulses in the multi-pulse train is increased by one.

Moreover, each of the recording pulse trains for forming the recording marks 7T to 11T is constituted of a first pulse, a multi-pulse train, and a last pulse. For example, the recording pulse train for forming the recording mark 7T includes a first pulse 701 disposed at the front, a last pulse 703 disposed at the backend, and a multi-pulse train 702 disposed between the first pulse 701 and the last pulse 703. The recording pulse train for forming the recording mark 7T includes a first pulse 704 disposed at the front, a last pulse 706 disposed at the backend, and a multi-pulse train 705 disposed between the first pulse 704 and the last pulse 706. The recording pulse trains for 3T and 4T only include first pulses. The recording pulse trains for 7T and 6T are each constituted only of a first pulse and a last pulse.

In the recording pulse trains of Example 6, the front pulse of the multi-pulse train is different in width from the other pulses in the recording pulse train of an even-numbered T mark. For example, the width is about 1.5T. The first pulse, the last pulse, and pulses other than the front pulse of the multi-pulse train are almost equal in width in all the marks. The width is about 1T. As to a width between adjacent pulses, an interval between the backend pulse of the multi-pulse train and the last pulse is larger than an interval between any other adjacent pulses in the odd-numbered T mark. For example, an interval is about 1.5T between the backend pulse of the multi-pulse train and the last pulse, whereas an interval is about 1T between any other adjacent pulses.

Besides, when laser power is insufficient at the rear of the odd-numbered T mark, instead of the front pulse of the multi-pulse train, the pulse at the backend may be larger in width than the other pulses. Further, an interval between the first pulse and the front pulse of the multi-pulse train may be larger than an interval between the other intervals.

The recording pulse trains of Example 6 are characterized by the features of the recording pulse trains of both Example 1 and Example 2. In the event of serious influence of a variation in the edge position of the recording mark, the crosstalk of a reproduction signal, and cross erase during recording, the influence can be reduced by forming recording marks using the recording pulse trains of Example 6.

In this way, according to the present embodiment, the period of the pulse in the multi-pulse train is set at 2T, which is longer than the reference period T of a recording modulation code. Hence, even when a recording speed is increased, the influence of the rising time and falling time of a laser is reduced, achieving correct recording.

Besides, in the above-described examples, recording is performed on the optical disc 101 with binary power of peak power and bias power. The kinds of power are not limited. Three or more kinds of power may be used for recording.

Figure 12:
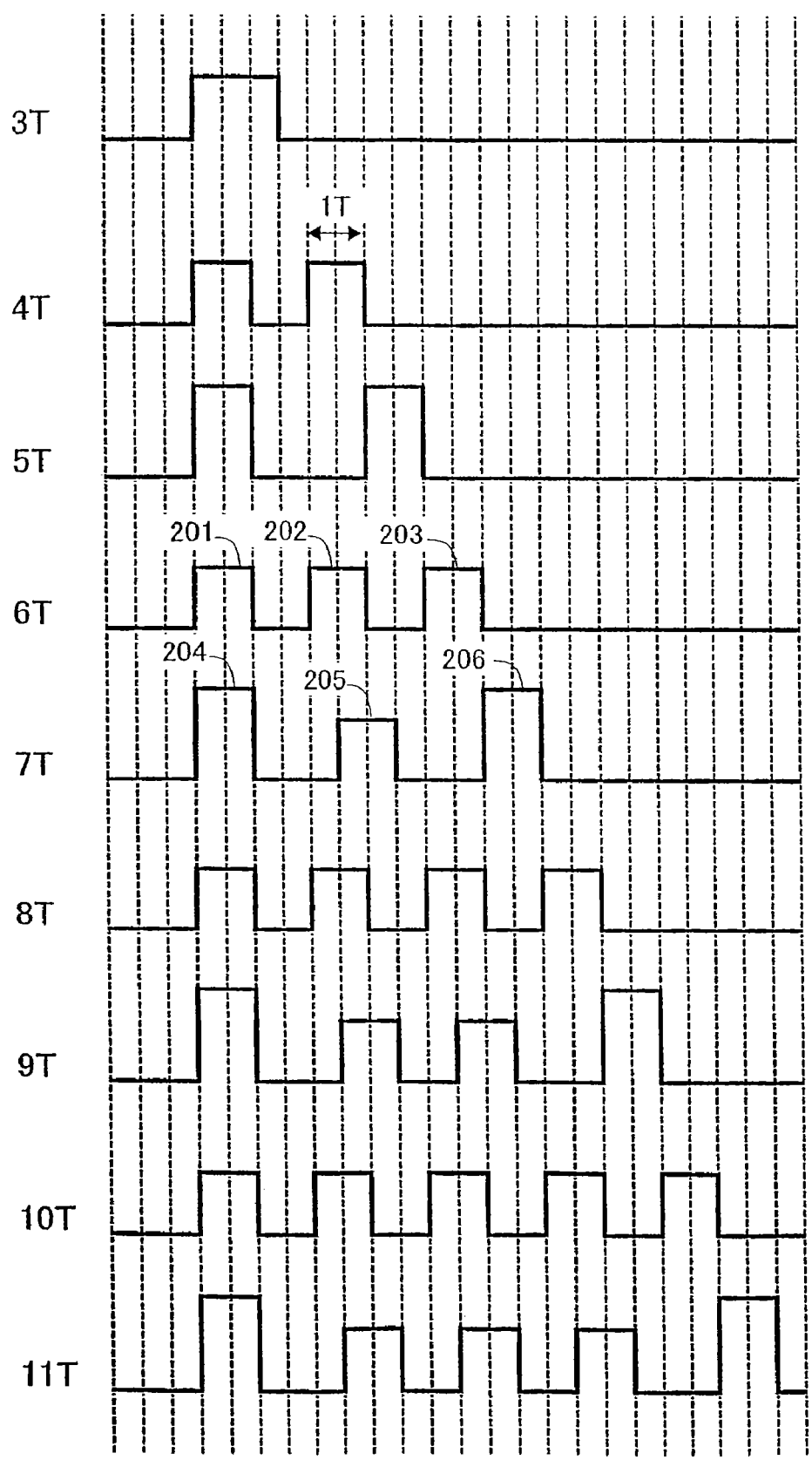
FIG. 12 is a diagram showing a variation of Example 1 of the recording pulse train according to Embodiment 1.

The recording pulse train of Example 7 in FIG. 12 is different from that of Example 1 in FIG. 6 in that the amplitude of a first pulse and a last pulse of an odd-numbered T other than 3T is larger, that is, laser irradiation power corresponding to a high level is larger than those of the other pulses.

As shown in FIG. 12, an equal number of pulses is included in each of a recording pulse train 2nT and a recording pulse train (2n+1)T where n represents an integer equal to or larger than 2. The recording mark (2n+1)T needs to be formed longer than recording mark 2nT. Thus, when the recording mark (2n+1)T is formed, a heat quantity may become insufficient as compared with the formation of the recording mark 2nT. For this reason, the first pulse and the last pulse are made larger in laser irradiation power than the other pulses. For example, the laser power of the first pulse and the last pulse are set at the power greater than those of other pulses and at 1.5 times those of other pulses or less. In order to produce such recording pulse trains, for example, the control section 104 may include another current source outputting a current greater than the current source 121 and a pair of switches connected with each other to form a series connection of the current source and the pair of switches. Also, the recording compensating section 108 may be adjusted so as to generate control signals which make the pair of switches in an ON state, in the case where the even-numbered recording pulse train having a recording mark of 5T or greater is to be generated.

By providing equal power for the pulses constituting the marks which are 2T apart, it is possible to utilize a regularity in generating the recording pulse trains. Therefore, the configurations of the control section 104 and the recording compensating section 108 can be simplified, compared to the case where each of the recording pulse train is generated so as to compensate the respective marks individually.

With these configurations, it is possible to prevent insufficient laser irradiation power from reducing the width of the recording mark between the first pulse and the front pulse of the multi-pulse train and between the backend pulse of the multi-pulse train and the last pulse where a pulse interval is longer than that of the recording pulse train 2nT. Hence, the recording mark can be formed with a correct mark width.

Instead of increasing the last pulse of the recording pulse train (2n+1)T in laser irradiation power, the backend pulse of the multi-pulse train in the recording pulse train (2n+1)T may be increased in laser irradiation power. Further, the recording pulse train 3T and the recording pulse train 4T may be different from each other in laser irradiation power.

Similarly, also in the recording pulse trains of Examples 2 to 6, by correcting irradiation power of the predetermined pulses, it is possible to compensate for insufficient laser irradiation power which is caused by equalizing the numbers of pulses in the recording pulse trains 2nT and (2n+1)T or the recording pulse trains (2n−1)T and 2nT.

Figure 13:
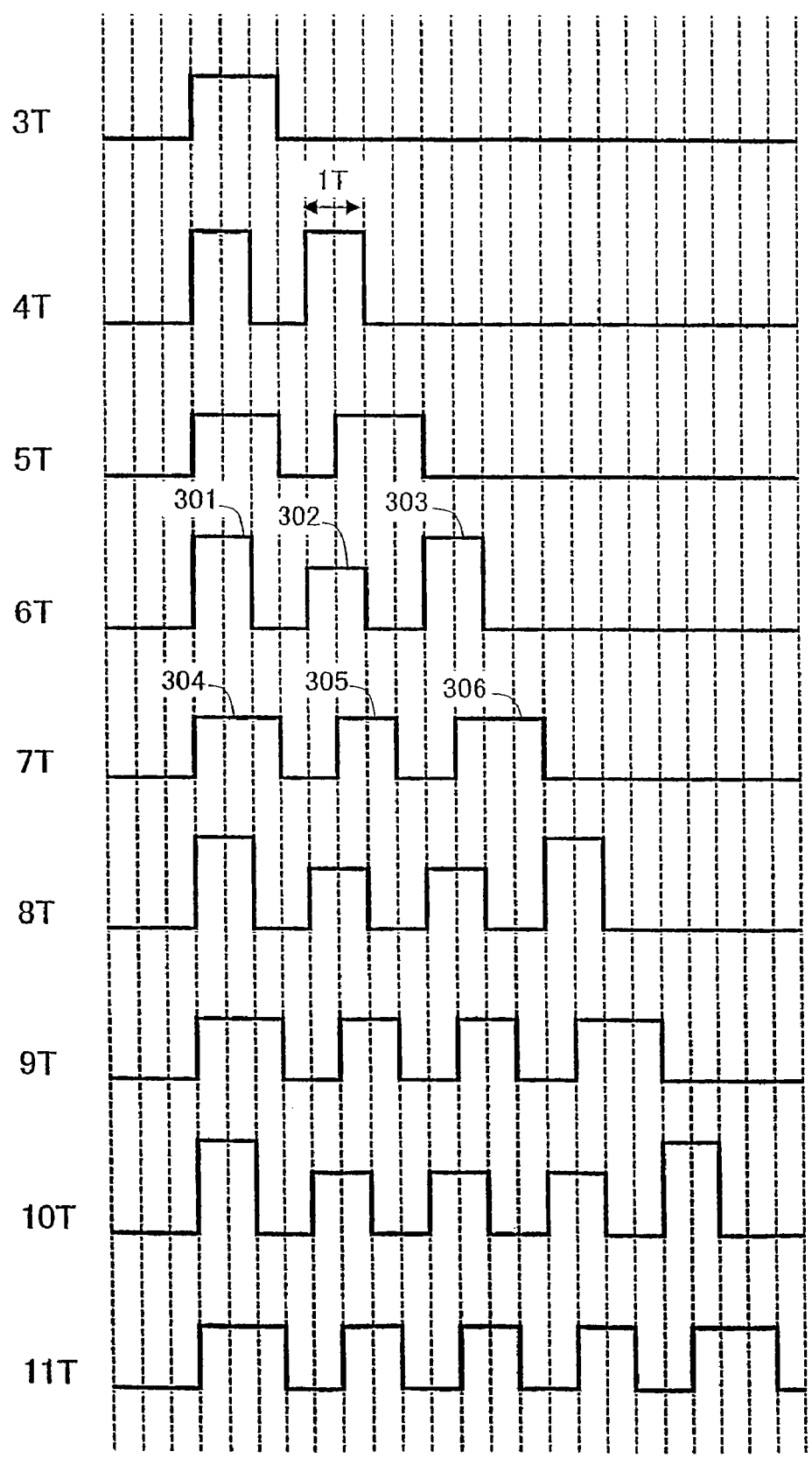
FIG. 13 is a diagram showing a variation of Example 2 of the recording pulse train according to Embodiment 1.

FIG. 13 shows a variation example of the recording pulse trains according to Example 2. The amplitude of a first pulse and a last pulse in a recording pulse train 2nT, that is, the laser irradiation power is made larger than those of the other pulses.

Figure 14:
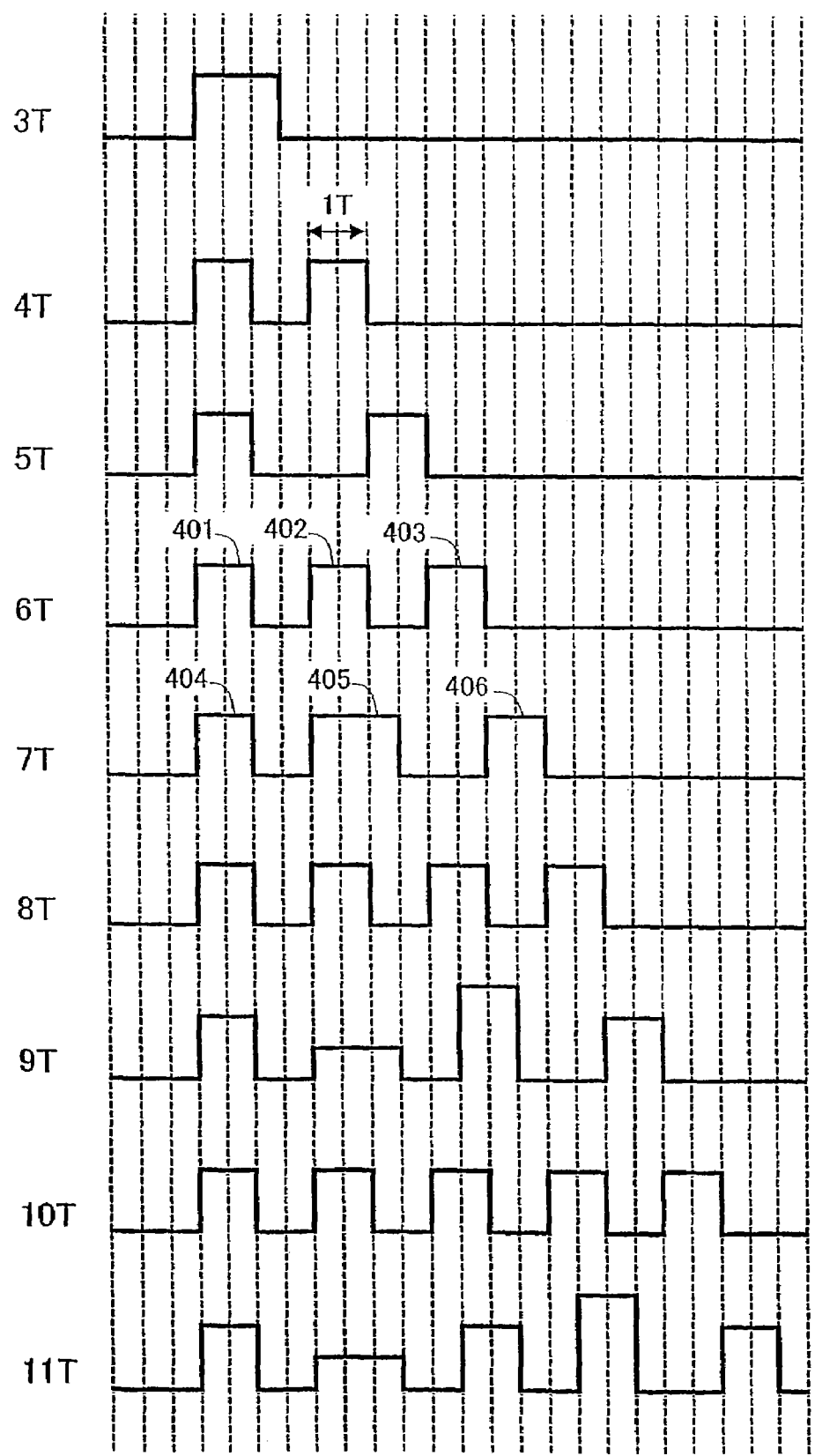
FIG. 14 is a diagram showing a variation of Example 3 of the recording pulse train according to Embodiment 1.

FIG. 14 shows a variation example of the recording pulse trains according to Example 3. The front pulse of a multi-pulse in a recording pulse train (2n+1)T is reduced in laser irradiation power, and a backend pulse is increased in laser irradiation power.

Figure 15:
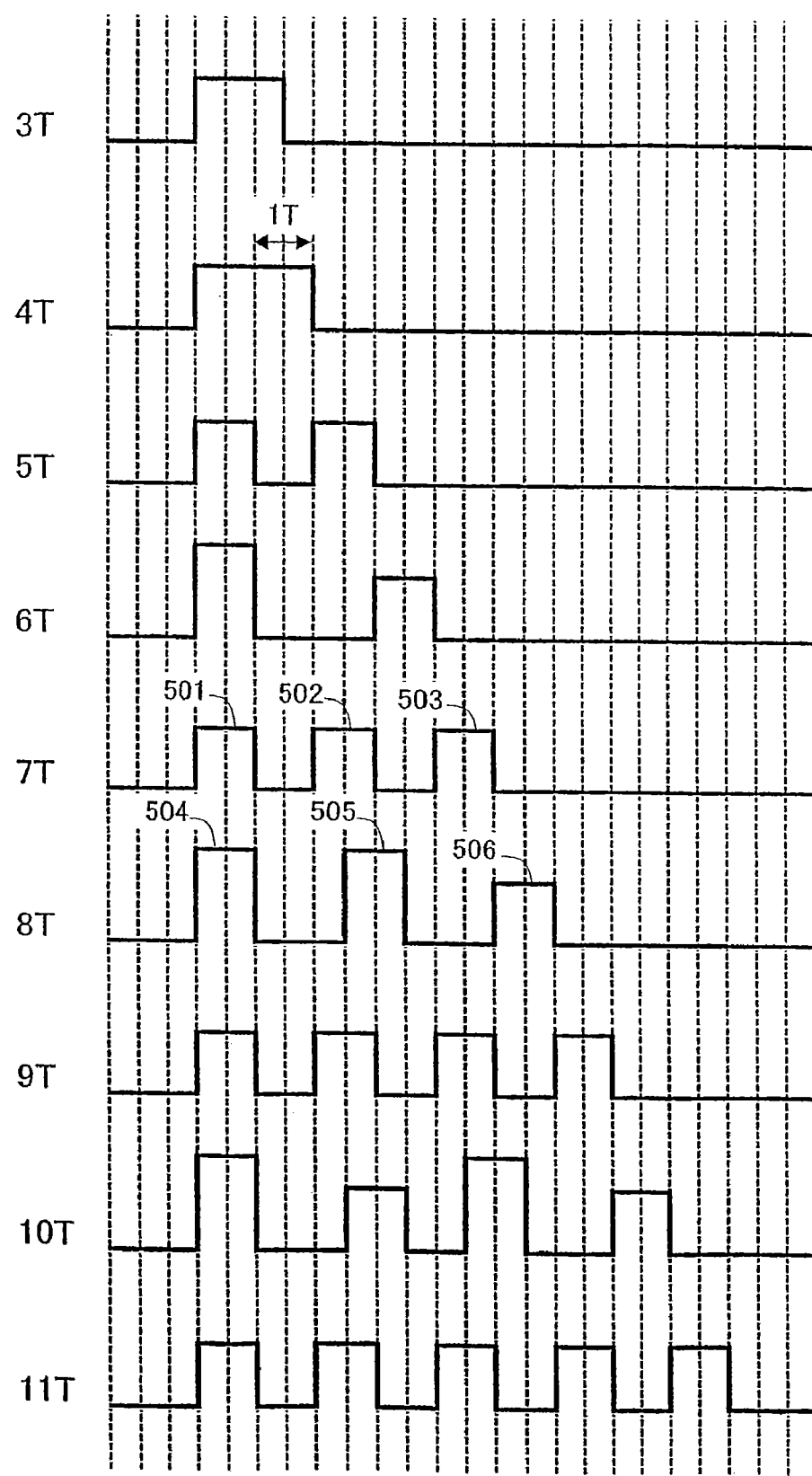
FIG. 15 is a diagram showing a variation of Example 4 of the recording pulse train according to Embodiment 1.

FIG. 15 shows a variation example of the recording pulse trains according to Example 4. Laser irradiation power is increased at a first pulse and the backend pulse of the front pulse of the multi-pulse in a recording pulse train 2nT.

Figure 16:
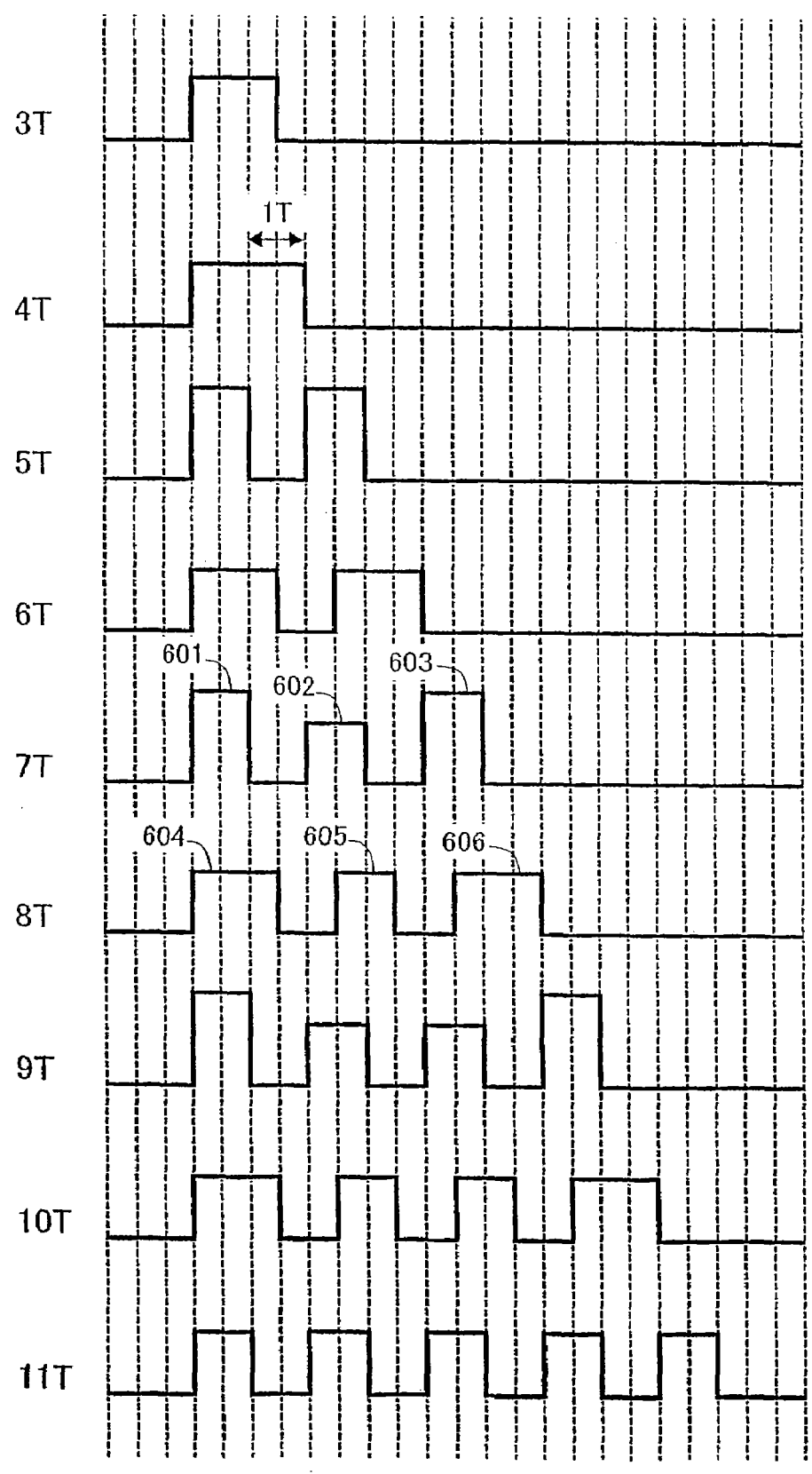
FIG. 16 is a diagram showing a variation of Example 5 of the recording pulse train according to Embodiment 1.

FIG. 16 shows a variation example of the recording pulse trains according to Example 5. Laser irradiation power is increased at the first pulse and the last pulse in a recording pulse train 2nT.

Figure 17:
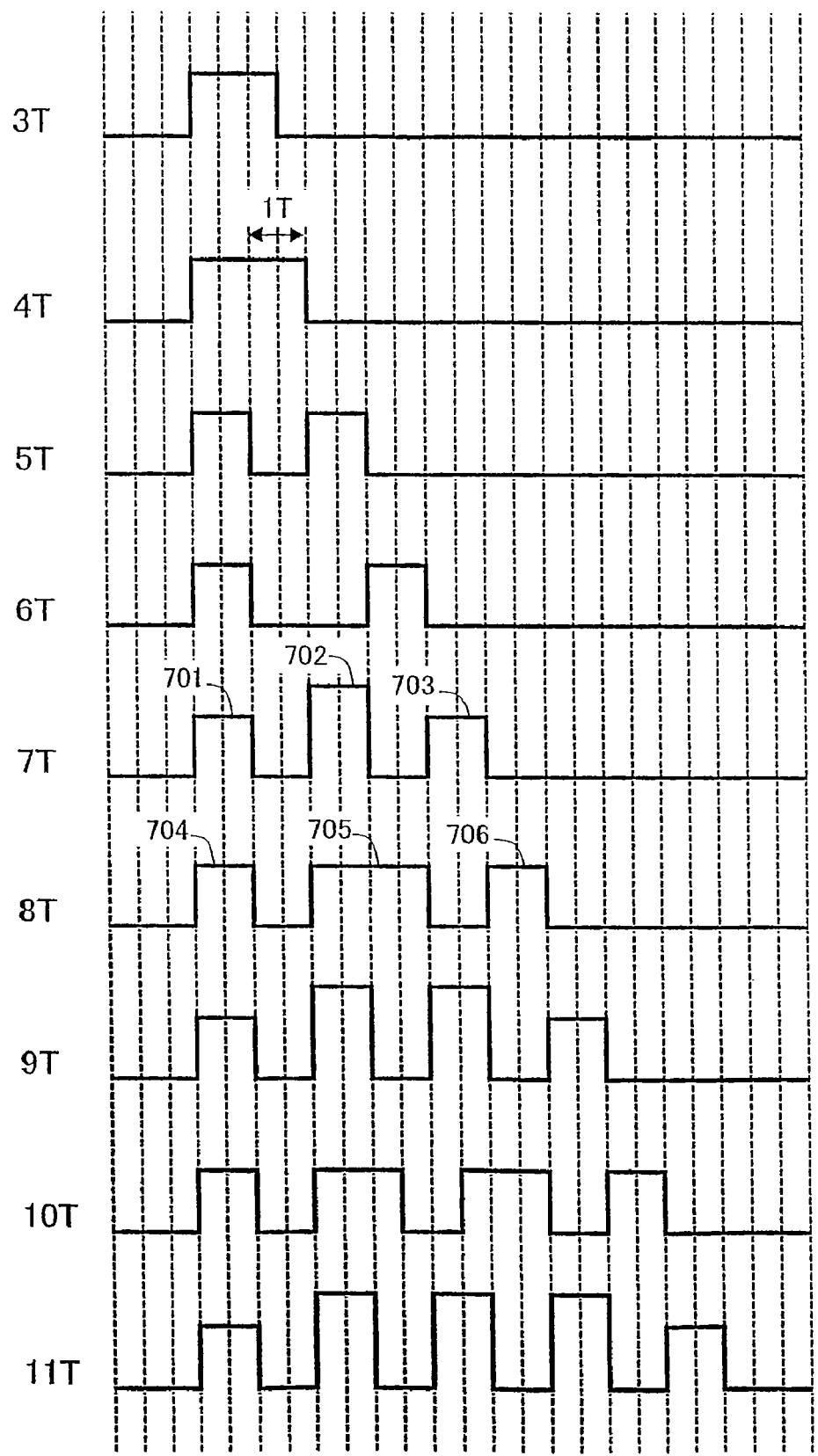
FIG. 17 is a diagram showing a variation of Example 6 of the recording pulse train according to Embodiment 1.

FIG. 17 shows a variation example of the recording pulse trains according to Example 6. Irradiation power is increased at the multi-pulse in a recording pulse train 2nT.

Additionally, in the present embodiment, a level may be provided in the recording pulse train to drive a laser diode with power lower than bias power. For example, a period with power lower than bias power may be provided on the rising position of the first pulse, the falling position of the last pulse, at a certain time after the last pulse, or before and after the multi-pulse. According to the present embodiment, even when a recording speed is increased, the influence of the rising time and falling time of a laser is reduced. Thus, the present embodiment is also effective when power lower than the bias power rises to peak power. In this case, fine adjustments may be performed on the end positions of these periods for each of the marks by the recording compensating section 108. Hence, the marks can be recorded on more accurate positions.

Further, in the examples explained referring FIGS. 12 to 17, the outputs of the peak powers at the predetermined pulses are changed. However, other powers, such as bias powers, used for forming the mark on an optical disc may be changed to adjust the laser irradiation power. In this case, the mark having a more suitable shape can be formed on an optical disc.

Further, adjustments may be made on, for example, irradiation power of some or all segments of the first pulse, some or all of the multi-pulses, and some or all segments of the last pulse, the adjustments being made for each or all of the marks in common by the recording compensating section 108 and the light beam control section 104. Thus, the marks can be recorded on more accurate positions.

Additionally, the irradiation start position information, irradiation width information, irradiation end information, and irradiation power information of the first pulse, the last pulse, and the multi-pulse may be recorded on an optical disc. By recording these kinds of information on the optical disc, the optical disc device can handle a variety of optical discs, thereby increasing the flexibility of a design in the manufacturing of the optical disc.

Figure 1:
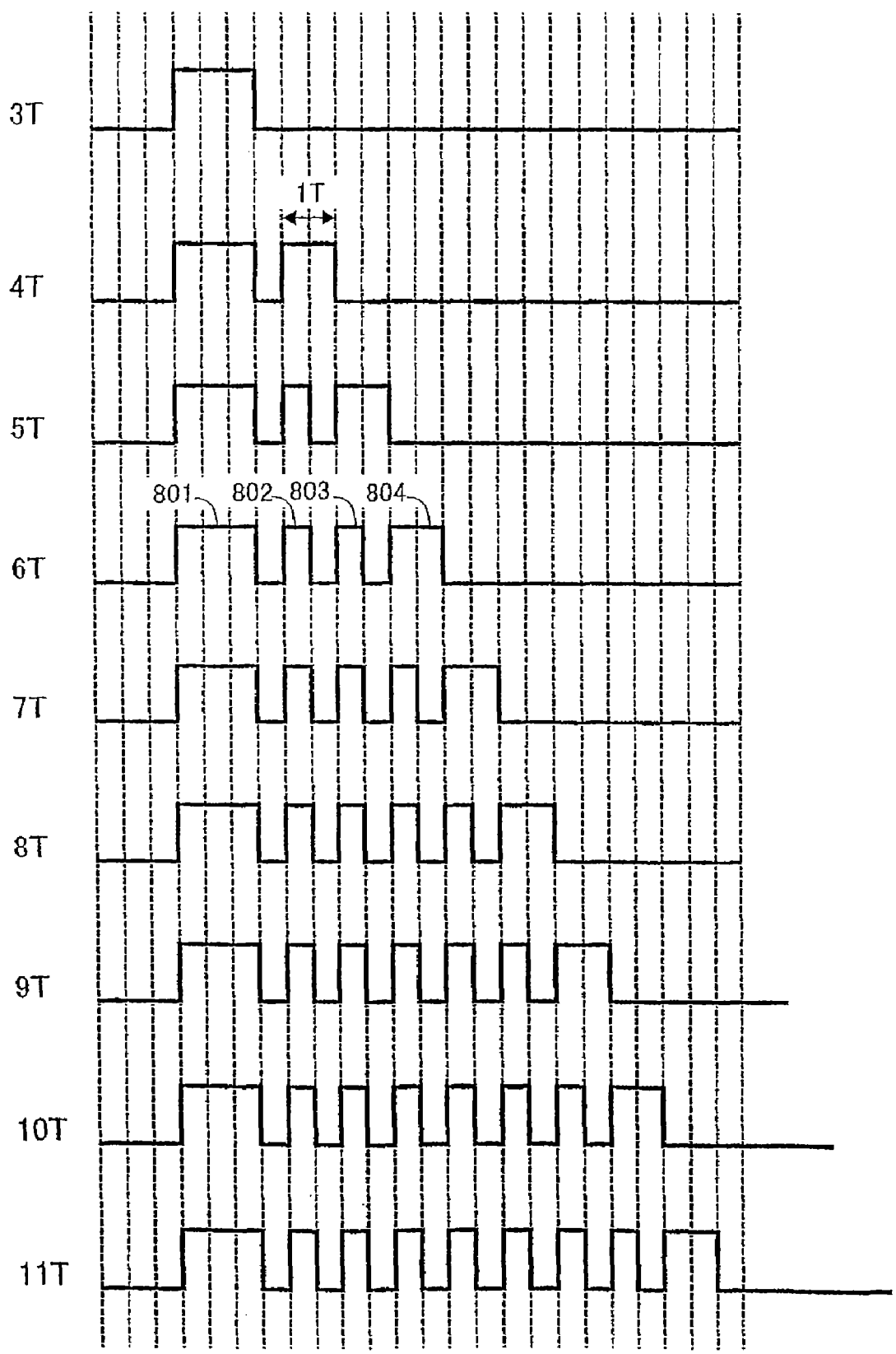
FIG. 1 is a diagram showing an example of a conventional recording pulse train.
Figure 2:
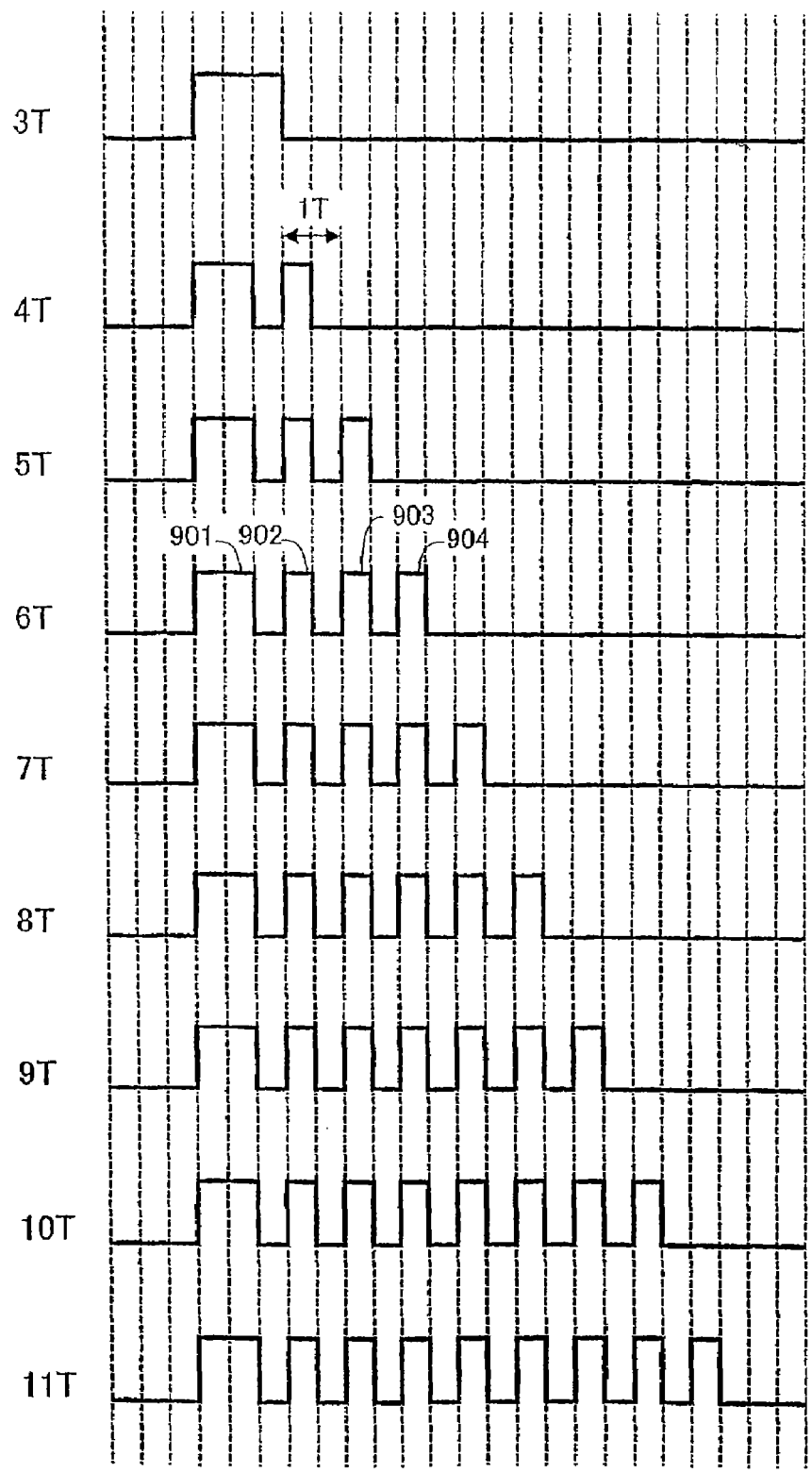
FIG. 2 is a diagram showing another example of the conventional recording pulse train.

Moreover, a code may be recorded on an optical disc to identify the recording method of FIG. 2 having an equal number of pulses in each of the recording pulse trains 2nT and (2n+1)T and the recording method of FIG. 6 having an equal number of pulses in each of the recording pulse trains (2n−1)T and 2nT. Hence, it is possible to select a recording method according to the characteristic of an optical disc, thereby increasing the flexibility of a design in the manufacturing of optical discs.

Further, mark constitution information may be recorded on the optical disc to discriminate whether each of the recording marks 3T to 11T is constituted of a single pulse, only a first pulse, only a first pulse and a last pulse, or all of a first pulse, a multi-pulse, and a last pulse.

When these kinds of information are recorded on an optical disc, for example, recording is performed on a disc information area on the innermost periphery of the optical disc. The information can be read during startup right after the loading of the optical disc into the optical disc device or just before data is recorded.

With the pulse waveform configuration according to the present embodiment, as compared with the conventional art in which the number of multi-pulses is increased by one every 1T, the width of the multi-pulse and an interval between adjacent multi-pulses are almost doubled. Even when a recording speed is increased, recording can be correctly performed.

Further, in addition to a multi-pulse, a pulse width of a given pulse including a first pulse and a last pulse and a pulse interval between any adjacent pulses are set at about 1T, so that the effect can be enhanced.

Moreover, the present embodiment provides regularity so that the number of the multi-pulses is increased by one every 2T, so that multi-pulses can be produced with a simple configuration as the multi-pulses produced every 1T.

The present embodiment described the phase-change disc. The present embodiment is also applicable to a magneto-optical disc with the same effect as the present embodiment.

Embodiment 2

As described in Embodiment 1, by equalizing the number of pulses in each multi-pulse train of recording pulse trains 2nT and (2n+1)T or recording pulse trains (2n−1)T and 2nT, the two recording pulse trains may be different from each other in laser irradiation power. This is because a duty of a mark/space or an average value is different between the multi-pulse trains.

FIGS. 18A and 18B show recording marks and reproduction signals obtained from the formed recording marks. The recording marks are formed by a recording pulse train 2 for forming a mark 9T of FIG. 10 and a recording pulse train 8 for forming a mark 10T.

As shown in FIG. 18A, in the recording pulse train 2, a first pulse 9 and a last pulse 10 each have a pulse width of 1T and supplies mark forming thermal energy suitable for a recording film of an optical disc. Thus, a recording mark 4 to be formed has an almost even width and a reproduction signal 6 is almost shaped like a trapezoid with a mark center not being recessed. Namely, the reproduction signal 6 is appropriate.

On the other hand, in the recording pulse train 8, since a first pulse 11 and a last pulse 12 each have a width of 1.5T, mark forming thermal energy is increased on the leading edge and the trailing edge of the mark. Thus, a recording mark 13 to be formed is increased in width on its leading edge and trailing edge, so that the mark 13 is shaped like an array. A reproduction signal 14, which is obtained from the recording mark 13 shaped like an array, has a double-humped waveform which is distorted by increased amplitude on a rising edge and a falling edge. When such a double-humped reproduction signal 14 is converted to a digital signal by binarization or AD conversion, jitter occurs on the rising edge and the falling edge of the waveform, resulting in a bit error during reproduction.

In the present embodiment, in order to obtain proper mark forming thermal energy in each of the recording pulse trains, the pulse position and the pulse width of the multi-pulse train are set while a duty value or an average value of amplitude of the multi-pulse trains is used as a target.

Figure 19:
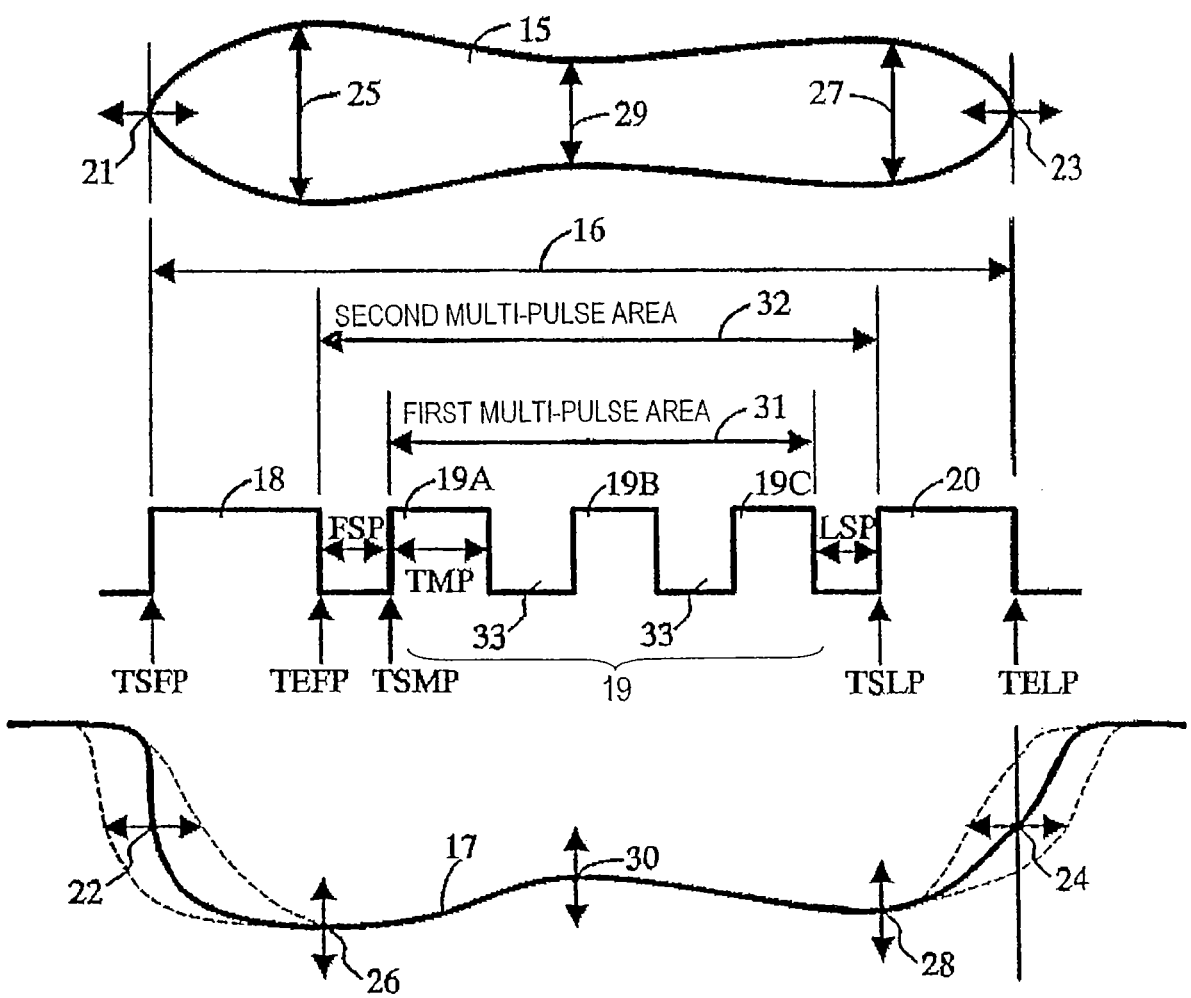
FIG. 19 shows a recording pulse train according to Embodiment 2, a recording mark formed by the recording pulse train, and the waveform of a reproduction signal obtained by reproducing the recording mark.

FIG. 19 shows a recording pulse train 16 of the present embodiment, a recording mark 15 formed by the recording pulse train 16, and a reproduction signal 17 obtained by the recording mark 15. The following will describe an example in which a recording modulation code has a length of 10T.

The recording pulse train 16 is constituted of a first pulse 18, a multi-pulse train 19, and a last pulse 20.

The timing of the first pulse 18 is set by first pulse rising timing TSFP and first pulse falling timing TEFP. Meanwhile, the timing of the last pulse 20 is set by last pulse rising timing TSLP and last pulse falling timing TELP. The arrangement of the multi-pulse train 19 is set by the rising timing TSMP and a pulse width TMP of a multi-pulse train.

The following will discuss a change in parameter constituting such a recording pulse train 16 and a relationship between the shape of the recording mark 15 and the waveform of the reproduction signal 17.

A leading edge position 21 of the recording mark 15 is determined by the first pulse rising timing TSFP.

The leading edge position 21 of the recording mark 15 is shifted by thermal interference from the previous recording mark, so that the reproduction signal 17 is changed as indicated by an arrow 22 of FIG. 19. In order to control the leading edge position 21 of the recording mark 15 to a proper position, the first pulse rising timing TSFP is properly set according to a length of the previous space and a length of the recording mark 15. Hence, no matter how the previous space and the following recording mark is combined, the leading edge position 21 of the recording mark can be controlled to a proper position according to the recording modulation code, reducing jitter components on a leading edge 22 of the waveform of the reproduction signal.

On the other hand, a trailing edge position 23 of the recording mark 15 is determined by the last pulse falling timing TELP. The trailing edge position 23 of the recording mark 15 is shifted by thermal interference from the following recording mark, so that the reproduction signal 17 is changed as indicated by an arrow 24 of FIG. 19.

In order to control the trailing edge position 23 of the recording mark 15 to a proper position, the last pulse falling timing TSLP is properly set according to a length of the previous space and a length of the recording mark 15. Hence, no matter how the recording mark and the following space are combined, the trailing edge position 23 of the recording mark can be controlled to a proper position according to the recording modulation code, reducing jitter components on a trailing edge 24 of the waveform of the reproduction signal.

A leading edge width 25 of the recording mark 15 is determined by the first pulse falling timing TEFP. The first pulse falling timing TEFP determines a width of the first pulse 18 and permits the control of thermal energy applied to the leading edge of the recording mark, so that the leading edge width 25 of the recording mark can be controlled to a proper width. Like the leading edge position 21 of the recording mark, the leading edge width 25 of the recording mark is less affected by thermal interference from the previous recording mark and a code length of the recording mark 15. Hence, the first pulse falling timing TEFP is generally set at a constant value regardless of a code length of the previous space and a code length of the recording mark 15.

The first pulse falling timing TEFP is set thus, so that the leading edge width 25 of the recording mark can be controlled to a proper width and an overshoot 26 can be reduced on the leading edge of the reproduction signal 17. Hence, in a reproduction signal obtained by a long recording modulation code, it is possible to reduce jitter components caused by changes in amplitude on the leading edge.

A trailing edge width 27 of the recording mark 15 is determined by the last pulse rising timing TSLP. The last pulse rising timing TSLP determines a width of the last pulse 20 and permits the control of thermal energy applied to the trailing edge of the recording mark, so that the trailing edge width 27 of the recording mark can be controlled to a proper width. Like the trailing edge position 23 of the recording mark, the trailing edge width 27 of the recording mark is less affected by thermal interference from the following recording mark and a code length of the recording mark 15. Hence, the last pulse rising timing TSLP is generally set at a constant value regardless of a code length of the following space and a code length of the recording mark 15.

The last pulse rising timing TSLP is set thus, so that the trailing edge width 27 of the recording mark 15 can be controlled to a proper width and an overshoot 28 can be reduced on the trailing edge of the reproduction signal 17. Hence, in a reproduction signal obtained by a long recording modulation code, it is possible to reduce jitter components caused by changes in amplitude on the trailing edge.

A width 29 around the center of the recording mark 15 is determined by the rising timing TSMP of the multi-pulse train and a multi-pulse train width TMP. As described in Embodiment 1, the period of the multi-pulse train is set at 2T, so that a laser diode can be positively driven by the multi-pulse train even at a high transfer rate.

In the case of recording at a high transfer rate with a high density, the irradiation time of a laser beam is shorter as compared with recording at a low transfer rate with a low density. Thus, it is necessary to more accurately set a width of the multi-pulse train to form a proper recording mark width. Moreover, when the period of the multi-pulse train is set at 2T, the width TMP of the multi-pulse train and a space 33 of the multi-pulse train are made larger than the period 1T, so that thermal energy is likely to be unevenly distributed. Hence, the proper setting of the multi-pulse train is important to form a recording mark of an optimum width.

A mark is formed around the center of the recording mark 15 according to the total thermal energy of the multi-pulse train 19. Thus, the configuration of the multi-pulse train 19 is determined by the rising timing TSMP of the multi-pulse train 19 and the pulse width TMP of the pulse constituting the multi-pulse train 19, and it is possible to control thermal energy applied to a portion around the center of the main part of the recording mark. Therefore, it is possible to adjust the width 29 around the center of the recording mark 15 to a proper width.

In this way, the width 29 around the center of the recording mark 15 is adjusted to a proper width, thereby reducing a change 30 in amplitude around the center of the reproduction signal 17. Hence, it is possible to reduce jitter components caused by a change in amplitude in the reproduction signal 17 obtained by a long recording modulation code.

As described above, a portion around the center of the recording mark 17 is formed by the total thermal energy of the multi-pulse train 19. At this point, an area including the multi-pulse train 19 can be defined by two different definitions. A different definition is used according to a sensitivity of a recording material and a mark recording speed of the optical disc.

In the optical disc which is relatively low in mark recording speed and has a recording material of a low recording sensitivity, the formation of a mark around the center of the main part of the recording mark 15 is associated with and affected mainly by a range from the rising timing of a front multi-pulse 19A, which is disposed at the front of the multi-pulse train 19, to the falling timing of a backend multi-pulse 19C, which is disposed at the backend of the multi-pulse train. This range will be referred to as a first multi-pulse area 31.

On the other hand, in an optical disc which is high in mark recording speed and has a recording material of a high recording sensitivity, the formation of a mark around the center of the recording mark 15 is associates with and affected mainly by a range from first pulse falling timing TEFP to the rising timing TSLP of the last pulse constituting the recording pulse train. This range will be referred to as a second multi-pulse area 32.

Further, according to a process for forming a mark of a recording material of the optical disc, two kinds of indexes are present which indicate thermal energy for the formation of a portion around the center of the recording mark 15.

In the case of an optical disc having a recording material in which a certain cooling time for a light irradiation portion in the multi-pulse area, that is, the space 33 of the multi-pulse train 19 is important to form the portion around the center of the recording mark 15, a multi-pulse duty is used as an index of thermal energy. The multi-pulse duty is a value obtained by dividing the multi-pulse width TMP by the period of the multi-pulse train (2T in FIG. 19) in the multi-pulse area.

On the other hand, in the case of an optical disc having a recording material in which an average light irradiation energy in the multi-pulse area is important (or correlation is strong) to form a portion around the center of the recording mark 15, a multi-pulse amplitude average value is used as an index of thermal energy. The multi-pulse amplitude average value is a value obtained by dividing an amplitude integral of the multi-pulse area by a time width of the multi-pulse area.

As described above, a multi-pulse duty and a multi-pulse amplitude average value are used as evaluation indexes, the rising timing TSMP of the multi-pulse train 19 and the multi-pulse train width TMP are adjusted, and the width 29 around the center of the recording mark 15 is properly maintained.

Further, in order to make even the width 25 on the leading edge of the recording mark, the width 29 around the center of the recording mark, and the width 27 on the trailing edge of the recording mark in a more balanced manner, setting is preferably performed at the following timing:

Setting is made to equalize a front space width FSP between the first pulse 18 and the front pulse 19A of the multi-pulse 19 and a backend space width LSP between the backend pulse 19C of the multi-pulse 19 and the last pulse 20. In this way, setting is made to FSP=LSP, so that energy applied by the multi-pulse 19 is emitted to a portion around the center of the recording mark in a balanced manner without being biased to the leading edge or the trailing edge of the recording mark. Therefore, the widths 25, 29, and 27 of the recording mark are made almost equal and a recording mark can be formed with equal widths in the longitudinal direction.

As described above, a multi-pulse duty and a multi-pulse amplitude average value are used as indexes and the rising timing TSMP of a multi-pulse train, the width TMP, the width FSP of the front space, and the width LSP of the backend space of the multi-pulse train in the multi-pulse area are set so that these parameters serve as predetermined targets. Thus, even in the case of recording at a high transfer rate with a high density, a recording mark can be formed with a proper width. Therefore, it is possible to reduce a reduction 30 in waveform amplitude around the center of a reproduction signal and reduce jitter components caused by a change in amplitude of a reproduction signal waveform in a long recording modulation code.

Figure 20:
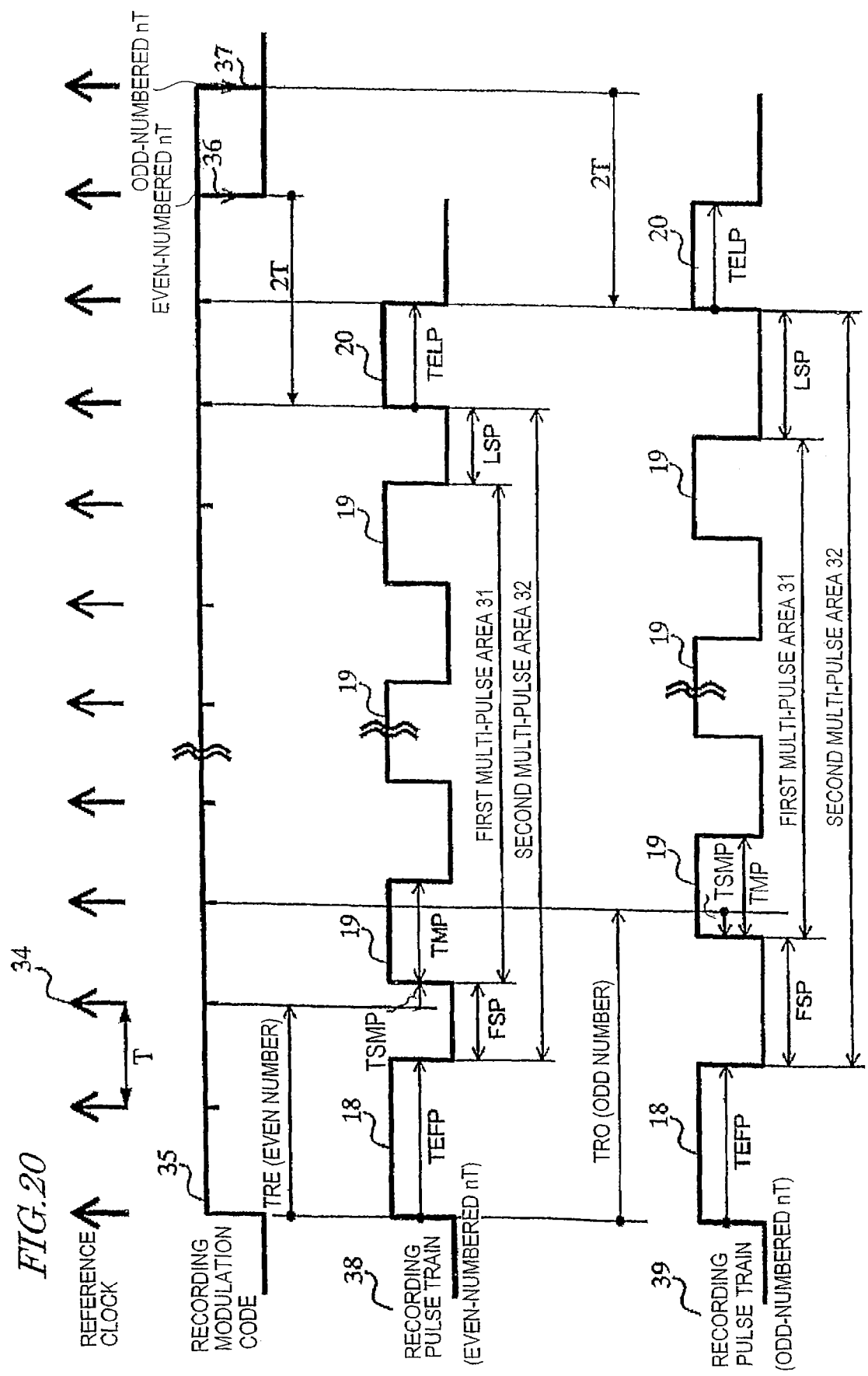
FIG. 20 is a diagram showing parameters for determining the recording pulse trains of Embodiment 2.

Referring to FIG. 20, the following will describe a specific method for calculating each timing of the recording pulse train 16 according to the present embodiment. FIG. 20 shows a reference clock, a recording modulation code, a recording pulse train of an even-numbered nT, and a recording pulse train of an odd-numbered nT in this order from the above. The horizontal direction of FIG. 20 serves as a time base.

The recording modulation code 35 has a recording modulation code length n times (n is a natural number equal to or larger than 1) as large as a reference clock period T34, which is a reference unit length. When n is an even number, a pulse falls on a position indicated by an even-numbered nT36. When n is an odd number, a pulse falls on a position indicated by an odd-numbered nT37. When the recording modulation code 35 is modulated by RLL (2, 10) modulating scheme as Embodiment 1, a code length is 3T to 11T.

As described above, the recording pulse train 16 is constituted of the first pulse 18, the multi-pulse train 19, and the last pulse 20.

The timing of the first pulse 18 is determined by the rising timing TSFP of the first pulse 18 and the falling timing TEFP of the first pulse 18. Since the value of TSFP does not affect the subsequent arithmetic results of the multi-pulse train, the value is not shown to simplify the explanation. The value is set at TSFP=0. As described with reference to FIG. 19, TSFP is properly set according to a code length of the previous space and a code length of the recording mark. As described above, TEFP is generally set at a constant value regardless of a code length of the previous space and a code length of the recording mark.

On the other hand, the timing of the last pulse 20 is determined by the rising timing TSLP of the last pulse 20 and the falling timing TELP of the last pulse 20. As described above, TSLP is set at a constant value regardless of a code length of the following space and a code length of the recording mark. TSLP (not shown) is set like TSLP=0 which reduces an overshoot on the trailing edge of a reproduction waveform. As described with reference to FIG. 19, TELP is properly set according to a code length of the following space and a code length of the recording mark.

The following will describe a method for calculating the rising timing TSMP of the multi-pulse train 19 in the multi-pulse area, the width TMP of the multi-pulse train, the width FSP of the front space, and the timing of the width LSP of the backend space.

Example 1 will be discussed below. In Example 1, the range affecting a width around the center of the recording mark is the first multi-pulse area 31. An index for controlling the timing of the multi-pulse train is a multi-pulse duty.

First, operations will be performed for a case 38 where a recording modulation code length is an even-numbered nT. In the case of the even-numbered nT, the rising timing TSMP of the multi-pulse train 19 is calculated relative to even-numbered reference timing TRE, which is delayed by 2T from the rising timing of the recording modulation code 35.

As shown in FIG. 20, the width FSP of the front space and the width LSP of the backend space are determined by an operation (40) below.

$$FSP=2T-TEFP+TSMP$$

$$LSP=2T-TMP-TSMP \qquad (40)$$

Further, when FSP=LSP is set as described above in order to keep a balance between the leading edge and the trailing edge of the recording mark width, according to the operation (40), the rising timing TSMP of the multi-pulse train is obtained by an operation (41) below.

$$TSMP=(TEFP-TMP)/2 \qquad (41)$$

Operations will be performed for a case 39 where a recording modulation code length is an odd-numbered nT.

TSMP of an odd-numbered nT is calculated relative to odd-numbered reference timing TRO, which is delayed by 3T from the rising timing of the recording modulation code 35.

Referring to FIG. 20, the width FSP of the front space and the width LSP of the backend space are determined by an operation (42) below.

$$FSP=3T-TEFP+TSMP$$

$$LSP=2T-TSMP-TMP \qquad (42)$$

When FSP=LSP is set as described above in order to keep a balance between the leading edge and the trailing edge of the recording mark width, according to the operation (42), the rising timing TSMP of the multi-pulse train is obtained by an operation (43) below.

$$TSMP=(TEFP-TMP-1T)/2 \qquad (43)$$

On the other hand, the multi-pulse duty MPD serving as a control target is a value obtained by dividing the width TMP of the multi-pulse train 19 by the period (2T in FIG. 20) of the multi-pulse train 19 in the first multi-pulse area 31. Thus, the multi-pulse duty MPD is obtained by an operation (44) below.

$$MPD=TMP/2T$$

Thus, $TMP=2T \cdot MPD$ \qquad (44)

As described above, the falling timing TEFP of the first pulse 18 is set at a constant value regardless of a code length of the previous space and a code length of the recording mark. In this example, TEFP is set at a value indicated below which causes less overshoot on the leading edge of the waveform of a reproduction signal.

TEFP=1.5T

Further, as the multi-pulse duty MPD required to properly keep the width 29 around the center of the recording mark, a value is selected which causes a smaller reduction in waveform amplitude around the center of a reproduction signal. According to observation results on the waveform of the reproduction signal, the proper value of MPD in the present example is expressed by the equation below.

MPD=0.5

Figure 21:
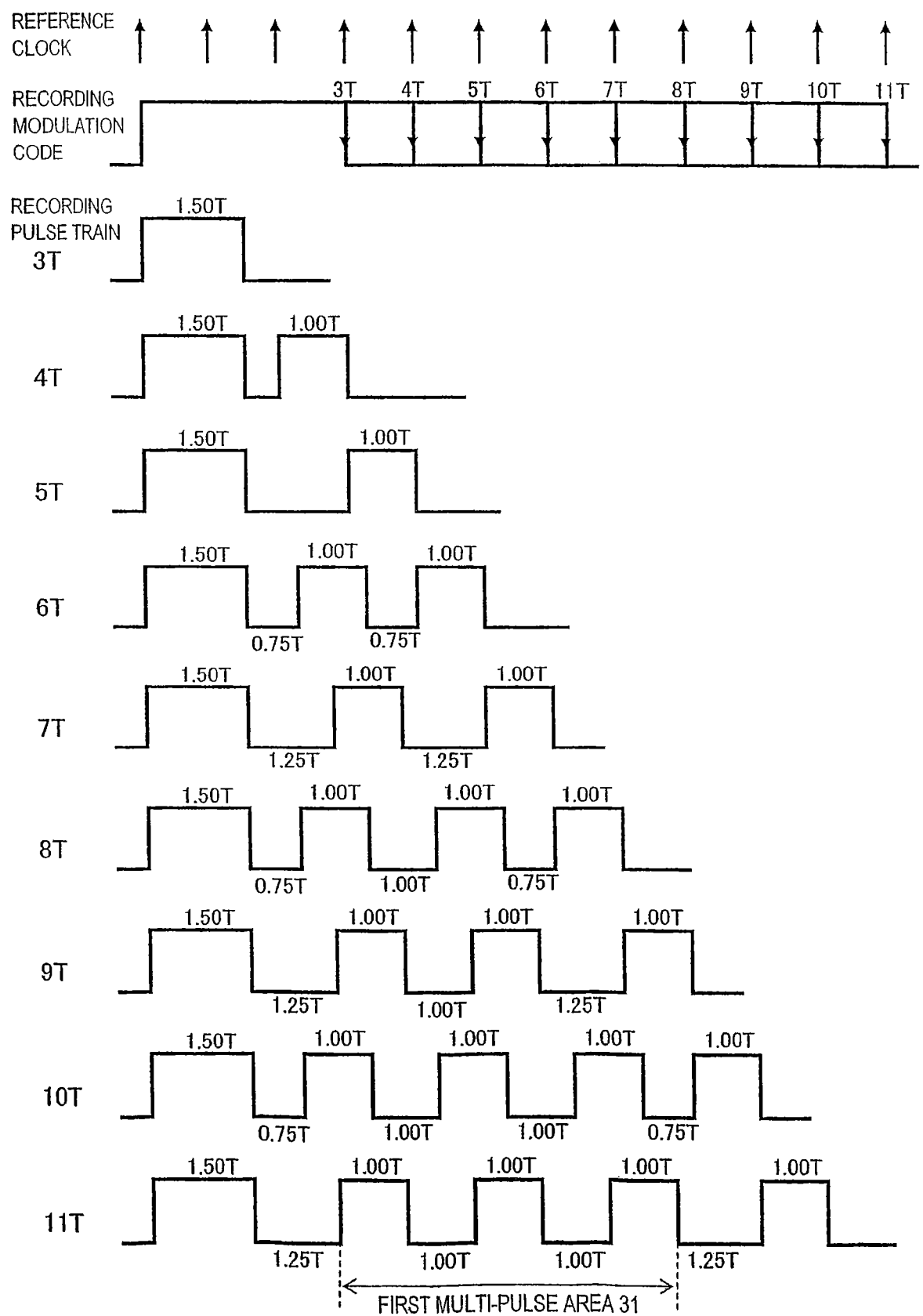
FIG. 21 is a diagram showing Example 1 of the recording pulse train according to Embodiment 2.

The values of TEFP and MPD are substituted into the operational expressions (40) to (44) to calculate the timing values of FSP, LSP, TSMP, and TMP in the recording modulation code length. FIG. 21 shows recording pulse trains obtained thus according to the present example.

As shown in FIG. 21, the multi-pulse duty MPD in the first multi-pulse area 31 has an equal value of 0.5 at each of the recording modulation code lengths. Moreover, the width FSP of the front space and the width FSP of the backend space are equal in the same recording modulation code.

In this way, according to the present example, irradiation thermal energy and cooling time around the center of the recording mark are equal at each of the recording modulation code lengths, and thermal energy on the leading edge and the trailing edge does not lose its balance over the recording modulation codes. Hence, for a recording modulation code of any length, it is possible to stably form a recording mark having an equal width from a leading edge to a trailing edge.

In the case of an optical disc which is relatively low in mark recording speed, has a recording material of low sensitivity, and requires a certain cooling time for a light irradiation portion of the multi-pulse area, the recording pulse trains of FIG. 21 are used to record data, so that the width of the formed recording mark can be evenly controlled from the leading edge to the trailing edge. Hence, without causing a reproduction signal to have a double-humped waveform of FIG. 18, recording can be performed with a small reduction in waveform amplitude around the center of a reproduction signal.

The following will describe Example 2 of the present embodiment. In Example 2, the range affecting a mark width around the center of a recording mark is the first multi-pulse area 31 and an index for controlling the timing of a multi-pulse train is a multi-pulse amplitude average value.

As shown in FIG. 20, in the case of an even-numbered nT, the rising timing TSMP of the multi-pulse train 19 is calculated relative to the even-numbered reference timing TRE, which is delayed by 2T from the rising timing of the recording modulation code 35. In the case of an odd-numbered nT, TSMP is calculated relative to the odd-numbered reference timing TRO, which is delayed by 3T from the rising timing of the recording modulation code 35.

Referring to FIG. 20, the width FSP of the front space and the width LSP of the backend space are obtained by an operation (45) below.

$FSP=2T-TEFP+TSMP$ (even-numbered $nT$)

$FSP=3T-TEFP+TSMP$ (odd-numbered $nT$)

$LSP=2T-TMP-TSMP$ (45)

When FSP=LSP is set as described above in order to maintain an even width of the recording mark, according to the operation (45), the rising timing TSMP of the multi-pulse train 19 is obtained by an operation (46) below.

$TSMP=(TEFP-TMP)/2$ (even-numbered $nT$)

$TSMP=(TEFP-TMP-1T)/2$ (odd-numbered $nT$)  (46)

On the other hand, a multi-pulse amplitude average value MPM serving as a control target is obtained by dividing an amplitude integral of the first multi-pulse area 31 by a time width of the first multi-pulse area. Thus, the multi-pulse amplitude average value MPM is calculated by an operation (47) below FIG. 20 where INT(X) is a function for calculating an integer of a value X.

$MPM=TMP \cdot INT\{(nT-4T)/2\}/(nT-2T-TEFP-FSP-LSP)$  (47)

When operational expression (46) is substituted into operational expression (47) and a multi-pulse width TMP is calculated, the following operational expression (48) is obtained.

$TMP=MPM \cdot (nT-6)/[INT\{(nT-4)/2\}]-MPM]$ (even-numbered $nT$)

$TMP=MPM \cdot (nT-7)/[INT\{(nT-4)/2\}]-MPM]$ (odd-numbered $nT$)  (48)

In the present example, the falling timing TEFP of the first pulse 18 is set at a constant value regardless of a code length of the previous space and a code length of the recording mark as described above. In the present example, a value is set below which causes less overshoot of a waveform on the leading edge of a reproduction signal.

TEFP=1.5T

Further, for the multi-pulse amplitude average value MPM required to properly keep the width 29 around the center of the recording mark, a value is selected which causes a smaller reduction in waveform amplitude around the center of a reproduction signal. According to observation results on the waveform of the reproduction signal, a proper value is expressed by MPM=0.5 in the present example.

Figure 22:
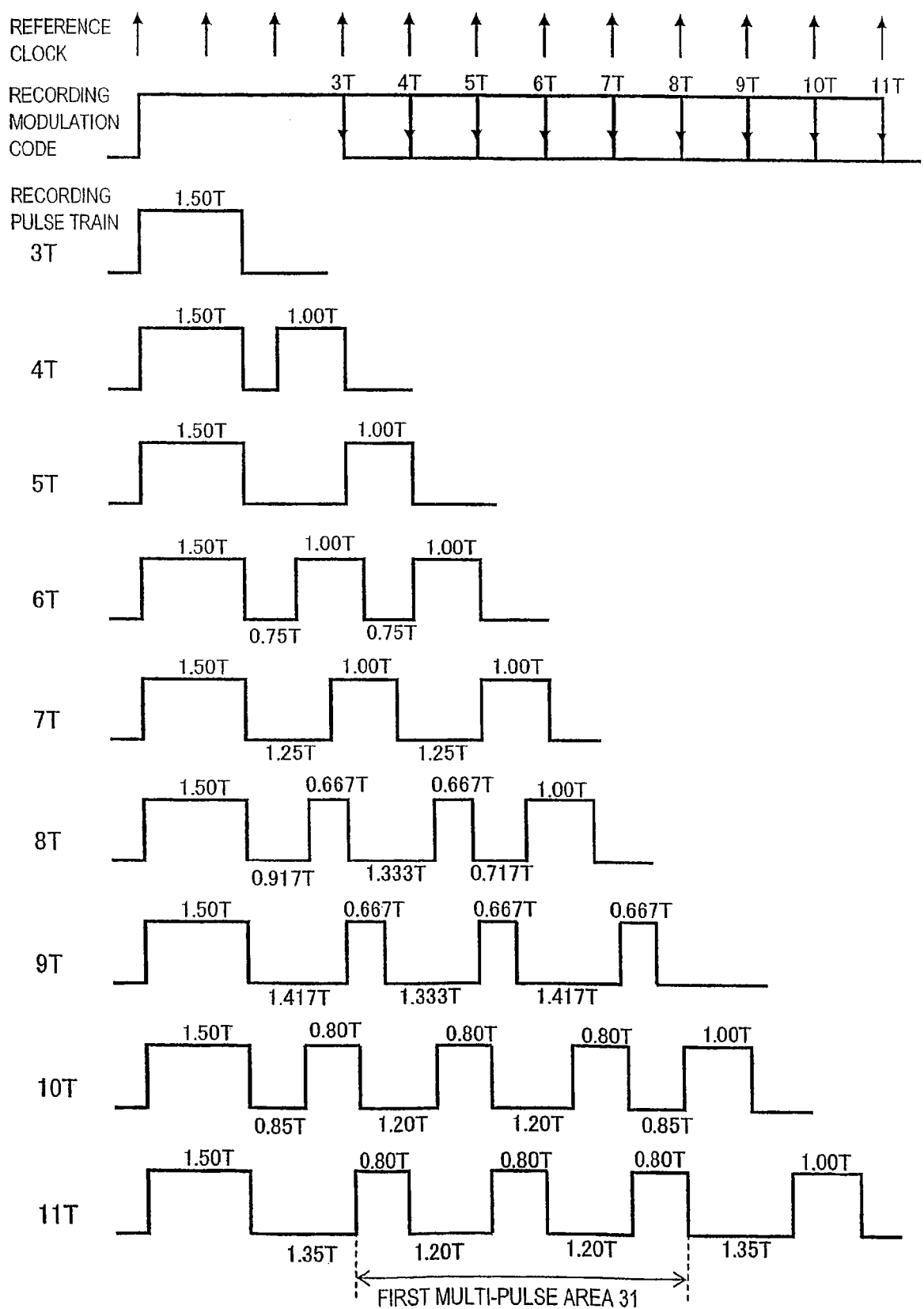
FIG. 22 is a diagram showing Example 2 of the recording pulse train according to Embodiment 2.

The values of TEFP and MPD are substituted into the operational expressions (45) to (48) to calculate the timing values of FSP, LSP, TSMP, and TMP in each of the recording modulation codes. FIG. 22 shows the waveforms of the recording pulse trains obtained thus according to the present example.

As shown in FIG. 22, multi-pulse amplitude average values MPM in the first multi-pulse area 31 are all equal to 0.5 regardless of a recording modulation code. Moreover, the width FSP of the front space and the width FSP of the backend space are also equal in the same recording modulation code.

In this way, according to the present example, average irradiation energy around the center of the recording mark is equal in each of the recording modulation codes, and thermal energy on the leading edge, the trailing edge, and the portion around the center of the mark does not lose its balance over the recording modulation codes. Therefore, with the recording modulation codes, it is possible to stably form a recording mark having an equal width from a leading edge to a trailing edge.

On an optical disc in which a mark recording speed is relatively low, a recording material has a low sensitivity, and average light irradiation energy in the multi-pulse area is important to form the recording marks, it is possible to form a recording mark with an even width from a leading edge to a trailing edge by using the recording pulse trains of FIG. 22.

Figure 18:
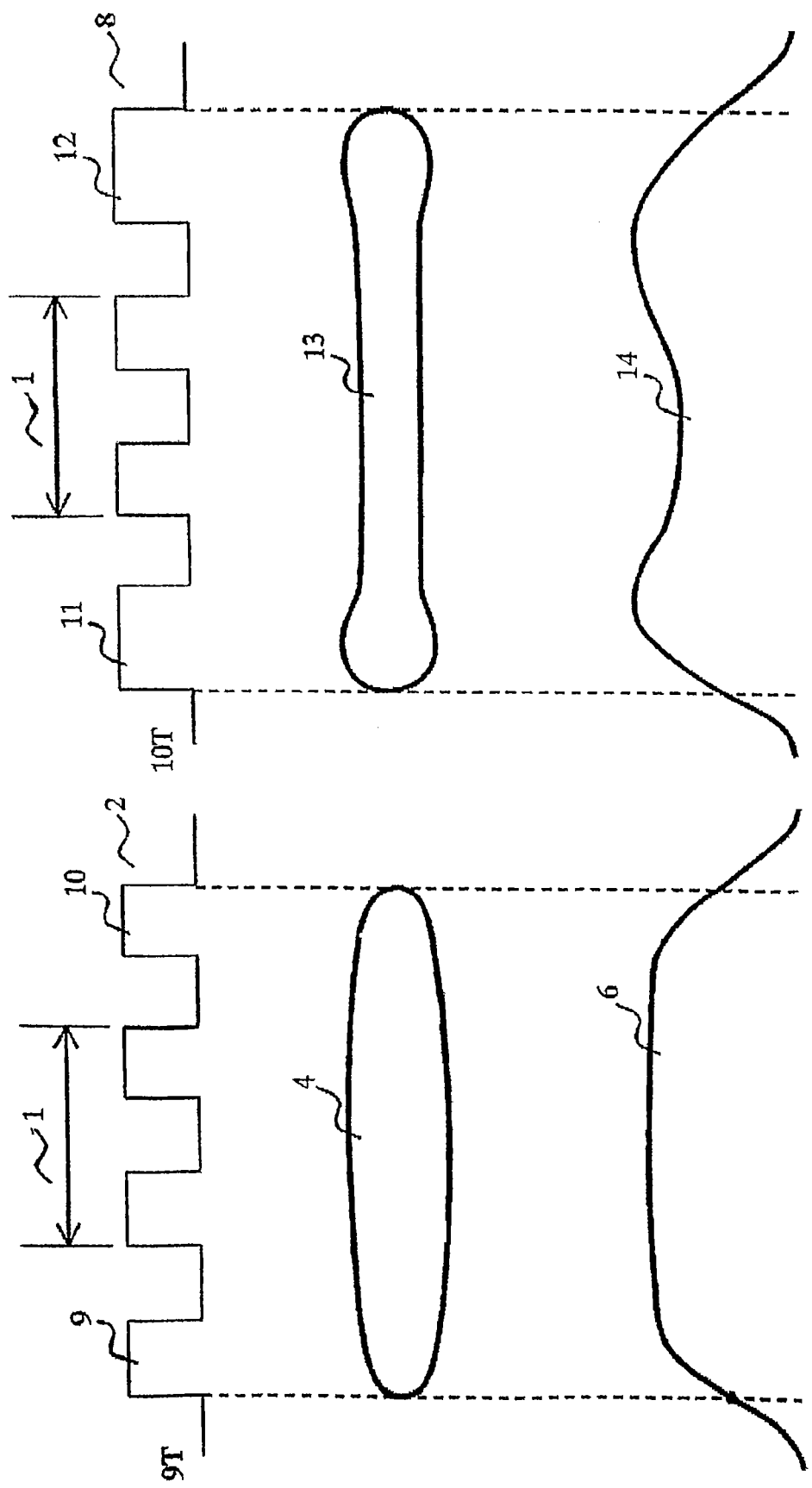
FIGS. 18A and 18B show recording marks formed by the conventional recording pulse train and the recording pulse train and the waveforms of reproduction signals obtained by reproducing the recording marks.

Hence, without causing a reproduction signal to have a double-humped waveform of FIG. 18, recording can be performed with a small reduction in waveform amplitude around the center of a reproduction signal.

Example 3 will be described below. In Example 3, the range affecting a mark width around the center of a recording mark is the second multi-pulse area 32 and an index for controlling the timing of a multi-pulse train is a multi-pulse amplitude average value.

As shown in FIG. 20, the width FSP of the front space and the width LSP of the backend space are calculated by an equation (49) below FIG. 20 as Example 2.

$$FSP=2T-TEFP+TSMP \text{ (even-numbered } nT\text{)}$$

$$FSP=3T-TEFP+TSMP \text{ (odd-numbered } nT\text{)}$$

$$LSP=2T-TMP-TSMP \quad (49)$$

Further, when FSP=LSP is set as described above in order to maintain an even width of the recording mark, according to the operation (49), the rising timing TSMP of the multi-pulse train is obtained by an operation (50) below.

$$TSMP=(TEFP-TMP)/2 \text{ (even-numbered } nT\text{)}$$

$$TSMP=(TEFP-TMP-1T)/2 \text{ (odd-numbered } nT\text{)} \quad (50)$$

On the other hand, a multi-pulse amplitude average value MPM serving as a control target is obtained by dividing an amplitude integral of the second multi-pulse area 32 by a time width of the second multi-pulse area 32. Thus, the multi-pulse amplitude average value MPM is calculated by an operation (51) below where INT(X) is a function for calculating an integer of a value X.

$$MPM=TMP \cdot INT\{(nT-4T)/2\}/(nT-2T-TEFP) \quad (51)$$

When the multi-pulse width TMP is calculated by the expression (51), an operational expression (52) is obtained.

$$TMP=MPM \cdot (nT-2T-TEFP)/INT\{(nT-4)/2)\} \quad (52)$$

In the present example, the falling timing TEFP of the first pulse 18 is set at a constant value regardless of a code length of the previous space and a code length of the recording mark as described above. In the present example, a value is set below which causes less overshoot of a waveform on the leading edge of a reproduction signal.

$$TEFP=1.5T$$

Further, as the multi-pulse amplitude average value MPM required to properly keep the width 29 around the center of the recording mark, a value is selected which causes a smaller reduction in waveform amplitude around the center of a reproduction signal. According to observation results on the waveform of the reproduction signal, a proper value is expressed by MPM=0.5 in the present example.

Figure 23:
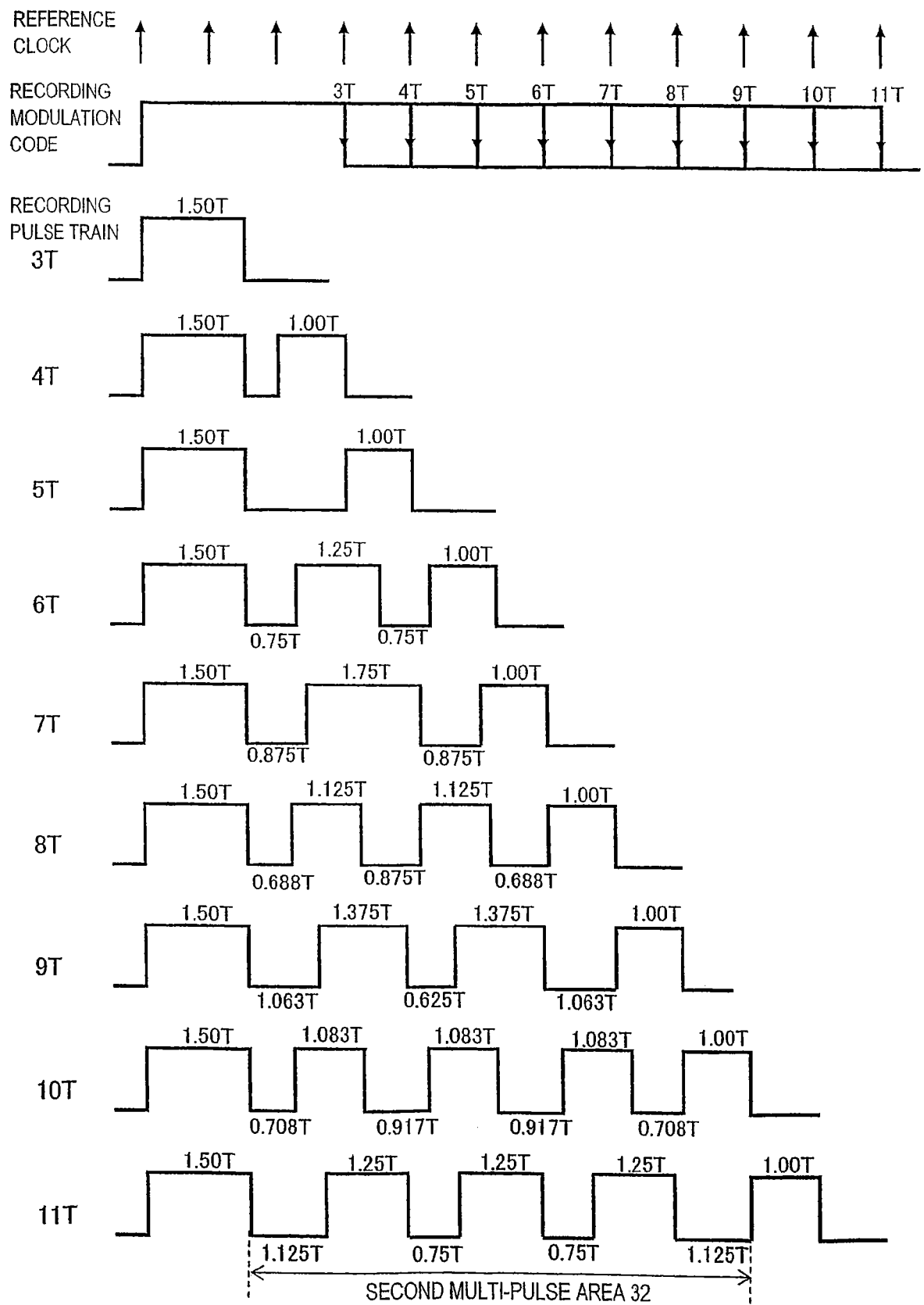
FIG. 23 is a diagram showing Example 3 of the recording pulse train according to Embodiment 2.

The values of TEFP and MPD are substituted into the operational expressions (49) to (52) to calculate the timing values of FSP, LSP, TSMP, and TMP in each of the recording modulation codes. FIG. 23 shows the waveforms of the recording pulse trains obtained thus according to the present example.

As shown in FIG. 23, multi-pulse amplitude average values MPM in the second multi-pulse area 32 are all equal to 0.5 regardless of a recording modulation code. Moreover, the width FSP of the front space and the width FSP of the backend space are also equal in the same recording modulation code.

In this way, according to the present example, average irradiation energy around the center of the recording mark is equal in each of the recording modulation codes, and thermal energy on the leading edge, the trailing edge, and a portion around the center of the mark does not lose its balance over the recording modulation codes. Therefore, it is possible to stably form a recording mark having an equal width from a leading edge to a trailing edge.

On an optical disc in which a mark recording speed is relative high, a recording material has a high sensitivity, and average light irradiation energy in the multi-pulse area is important to form the recording marks, it is possible to form a recording mark with an even width from a leading edge to a trailing edge by using the recording pulse trains of FIG. 23. Hence, without causing a reproduction signal to have a double-humped waveform of FIG. 18, recording can be performed with a small reduction in waveform amplitude around the center of a reproduction signal.

In the present embodiment, the timing values (FSP, LSP, TSMP, and TMP) of the recording pulse train to be controlled are calculated and set for each of the recording modulation codes. However, in order to shorten the setting time of a recording device, to reduce the circuit size of the recording device, or to simplify the circuit, two kinds of timing values may be set for an even-numbered nT and an odd-numbered nT of the recording modulation code length. For example, in the recording pulse trains of FIG. 21, operations are performed for each of the recording modulation codes to calculate each timing value, resulting in two kinds of arithmetic results for an even-numbered nT and an odd-numbered nT. Namely, the timing values are expressed as below.

Even-numbered nT:

$$FSP=LSP=0.75T$$

$$TMP=1.0T$$

$$TSMP=0.25T$$

Odd-numbered nT:

$$FSP=LSP=1.25T$$

$$TMP=1.0T$$

$$TSMP=-0.25T$$

Further, for the same reason, each of the recording modulation codes may be divided into code length groups which are classified according to a code length, and the timing values (FSP, LSP, TSMP, TMP) of the recording pulse may be set at an equal value in a code length group.

Alternatively, in order to reduce the circuit size or the like, the timing values (FSP, LSP, TSMP, TMP) of the recording pulse may be all set at an equal value regardless of a recording modulation code length.

Meanwhile, in Examples 1 to 3 of the present embodiment, a target value of a multi-pulse duty or a multi-pulse amplitude average value is set according to the observation results on the waveform of a reproduction signal, and the timing values of all the recording pulse trains are determined using the value. However, in order to control the width of the recording mark more accurately, the following steps may be applicable: the recording modulation code is divided into specific code groups, a target value of a multi-pulse duty or multi-pulse amplitude average value is set for each of the code groups, and a timing value is determined using a different target value for each of the code groups. Furthermore, in order to control the width of the recording mark more accurately, division may be made into two kinds of an even-numbered nT and an odd-numbered nT of a recording modulation code to set a target value of an index or set a target value for each of the recording modulation code lengths.

Figure 24:
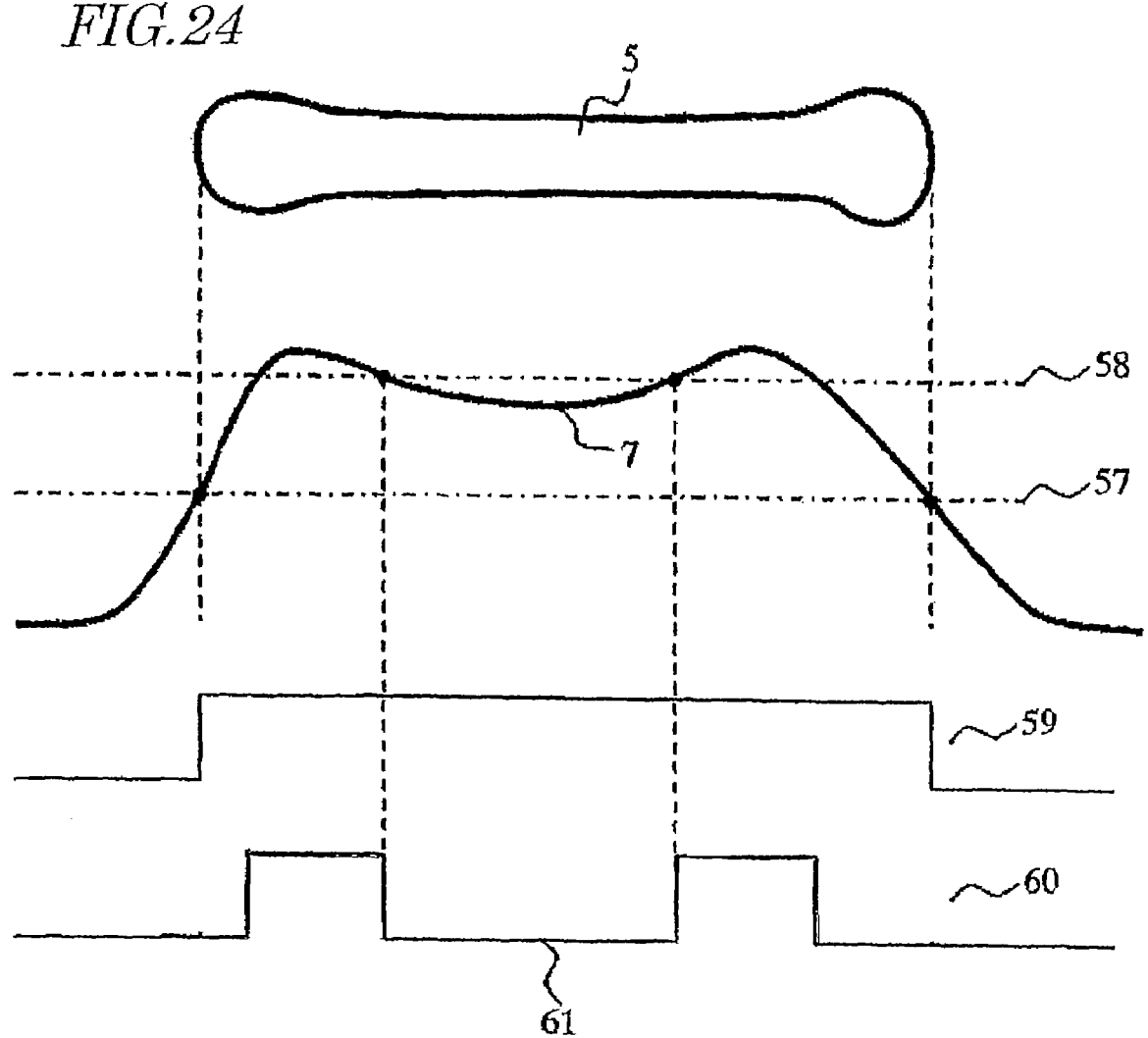
FIG. 24 is a diagram for explaining an evaluation method for deciding whether a target value for determining a parameter is proper or not according to Embodiment 2.

Referring to FIG. 24, the following will describe a method for evaluating a reproduction signal to decide whether or not a multi-pulse duty and a multi-pulse amplitude average value are proper that are the indexes of the timing values in the recording pulse train.

When a multi-pulse duty and a multi-pulse amplitude average value are not proper, energy for irradiating a portion around the center of the recording mark become insufficient. Thus, the center of the mark is reduced in width and a double-humped mark 5 is formed with a smaller width around the center of the mark. When the double-humped mark 5 is reproduced, a reproduction signal 7 is reduced in waveform amplitude value around the center, resulting in a distorted waveform having a double-humped shape.

A binarizing slice level 57 for converting the reproduction signal 7 into digital data is normally set at about a half the maximum amplitude of the waveform of the reproduction signal 7. Hence, in the case of a proper slice level, a binarized digital signal 59 is acquired.

When a slice level is increased and a binarized slice level 58 is set, a portion reduced in amplitude around the center of the reproduction signal 7 is cut by the binarizing slice level 58 and a binarized digital signal 60 including a pulse of two pulses is generated. Since a low level 61 occurs halfway through the binarized digital signal 60, reproduction cannot be performed to a correct recording modulation code.

Therefore, a multi-pulse duty and a multi-pulse amplitude average value in the multi-pulse area are firstly set and the timing values of the recording pulse train are determined by using the set values according to the above method. A recording mark is formed on the optical disc by using the determined recording pulse train. Subsequently, a reproduction signal obtained from the formed recording mark is binarized using a binarizing slice level higher than an ordinary slice level. It is decided whether or not the obtained binarized signal includes a low level and forms two pulses.

When the binarized signal includes two pulses, it is understood that the center of the recording mark is reduced in width. Namely, it is found that target values set as a multi-pulse duty and a multi-pulse amplitude average value are not proper.

In this way, according to the present embodiment, the period of the multi-pulse train is set at 1T or larger, and the rising timing TSMP of the multi-pulse train, the width TMP of the multi-pulse train, the width FSP of the front space, and the width LSP of the backend space in the multi-pulse area are set so as to set a multi-pulse duty and a multi-pulse amplitude average value at a predetermined target value. Thus, even when recording is performed at a high transfer rate with a high density, it is possible to obtain a recording pulse train where a recording mark can be formed with a proper width. The waveform of a reproduction signal obtained by the recording mark formed thus has a smaller reduction in amplitude around the center, and less distortion occurs on the rising edge and the falling edge of the signal. Hence, even when a long recording modulation code is recorded, it is possible to reduce the influence of jitter and suppress a reproduction bit error.

Moreover, according to the present invention, by detecting reduced amplitude around the center of the waveform of the reproduction signal, it is possible to detect a reduced width around the center of the recording mark. Thus, it is possible to decide whether or not a multi-pulse duty and a multi-pulse amplitude average value in the multi-pulse area are proper control targets.

INDUSTRIAL APPLICABILITY

According to the present invention, even when data is recorded at a high transfer rate, a recording mark with a correct shape can be formed on a data storage medium such as an optical disc. Therefore, the recording method of the present invention can be suitably used for an optical disc, on which recording is performed with a high density and a high transfer rate, and an optical disc device provided for such an optical disc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A recording method comprising the steps of:
  modulating data to be recorded, to generate a plurality of recording modulation codes; and
  emitting a pulsed light beam to a data storage medium, so that a plurality of recording marks and spaces are recorded on the data storage medium, the lengths of the recording marks and spaces being defined by the modulated data, wherein
  at least two of the plurality of the recording marks comprise:
  a first pulse which is disposed at a front and forms a leading edge of the recording mark;
  a last pulse which is disposed at a backend and forms a trailing edge of the recording mark; and
  a multi-pulse train which is disposed between the first pulse and the last pulse and forms a center of the recording mark,
  the multi-pulse train has a pulse period longer than T, T representing a reference period of the recording modulation code,
  the number of pulses in each of the recording marks is increased by one as the recording mark is increased in length by 2T,
  the plurality of recording marks have different lengths differing by T or multiples thereof from one another,
  the shortest recording mark and the second shortest recording mark are each constituted by a single pulse, and
  among the recording marks each constituted by two or more pulses, a pulse width of the last pulse of any recording mark that has a predetermined length is equal to a pulse width of the last pulse of any recording mark that has a length which is 2T longer than the predetermined length,
  wherein a last pulse rising timing of an $n^{th}$ (n is an odd number which is three or greater) shortest recording mark and a last pulse rising timing of an $(n+1)^{th}$ shortest recording mark are different from each other by 0.5T, and a last pulse rising timing of an $(n+1)^{th}$ shortest recording mark and a last pulse rising timing of an $(n+2)^{th}$ shortest recording mark are different from each other by 1.5T.

2. A data storage medium comprising a recording area on which a plurality of recording marks and spaces having lengths defined by a predetermined modulation method are formed by emitting a pulsed light beam to the data storage medium, wherein at least two of the plurality of the recording marks comprise:

a first pulse which is disposed at a front and forms a leading edge of the recording mark;

a last pulse which is disposed at a backend and forms a trailing edge of the recording mark; and a multi-pulse train which is disposed between the first pulse and the last pulse and forms a center of the recording mark, the multi-pulse train has a pulse period longer than T, T representing a reference period of the recording modulation code, the number of pulses in each of the recording marks is increased by one as the recording mark is increased in length by 2T, the plurality of recording marks have different lengths differing by T or multiples thereof from one another, the shortest recording mark and the second shortest recording mark are each constituted by a single pulse, and among the recording marks each constituted by two or more pulses, a pulse width of the last pulse of any recording mark that has a predetermined length is equal to a pulse width of the last pulse of any recording mark that has a length which is 2T longer than the predetermined length, wherein a last pulse rising timing of an $n^{th}$ (n is an odd number which is three or greater) shortest recording mark and a last pulse rising timing of an $(n+1)^{th}$ shortest recording mark are different from each other by 0.5T, and a last pulse rising timing of an $(n+1)^{th}$ shortest recording mark and a last pulse rising timing of an $(n+2)^{th}$ shortest recording mark are different from each other by 1.5T.

3. A method for reproducing data recorded on the data storage medium defined by claim 2, the method comprising the step of reproducing data recorded on the data storage medium by emitting a light beam to the recording area of the data storage medium.

* * * * *